(12) United States Patent
Wang et al.

(10) Patent No.: US 8,153,240 B2
(45) Date of Patent: Apr. 10, 2012

(54) CARBON NANOSTRUCTURES AND METHODS OF MAKING AND USING THE SAME

(75) Inventors: Jianjun Wang, Williamsburg, VA (US); Mingyao Zhu, Williamsburg, VA (US); Brian C. Holloway, Williamsburg, VA (US); Ronald A. Outlaw, Williamsburg, VA (US); Dennis M. Manos, Williamsburg, VA (US); Xin Zhao, Williamsburg, VA (US)

(73) Assignee: College of William and Mary, Williamsburg, VA (US)

( * ) Notice: Subject to any disclaimer, the term of this patent is extended or adjusted under 35 U.S.C. 154(b) by 869 days.

(21) Appl. No.: 10/574,507

(22) PCT Filed: Oct. 4, 2004

(86) PCT No.: PCT/US2004/032585
§ 371 (c)(1),
(2), (4) Date: Sep. 5, 2006

(87) PCT Pub. No.: WO2005/084172
PCT Pub. Date: Sep. 15, 2005

(65) Prior Publication Data
US 2009/0011204 A1 Jan. 8, 2009

Related U.S. Application Data

(60) Provisional application No. 60/508,675, filed on Oct. 3, 2003.

(51) Int. Cl.
*B32B 7/02* (2006.01)
*B32B 27/32* (2006.01)
*B32B 5/16* (2006.01)
*B32B 9/00* (2006.01)
*B32B 15/02* (2006.01)
*B32B 17/02* (2006.01)
*B32B 19/00* (2006.01)
*B32B 21/02* (2006.01)
*B32B 23/02* (2006.01)
*B32B 27/02* (2006.01)

(52) U.S. Cl. .......... 428/215; 428/220; 428/402; 977/755

(58) Field of Classification Search ............... 423/447.2; 427/249.1; 428/215, 220, 402; 977/755
See application file for complete search history.

(56) References Cited

U.S. PATENT DOCUMENTS 5,372,686 A 12/1994 Timberlake et al.
6,104,600 A 8/2000 Suhara et al.
(Continued)

FOREIGN PATENT DOCUMENTS

WO  WO 2005/084172 A2  9/2005

OTHER PUBLICATIONS

Shang et al. Chemical Physics Letters 358 (2002) 187-191.*
(Continued)

*Primary Examiner* — Keith Hendricks
*Assistant Examiner* — Eli Mekhlin
(74) *Attorney, Agent, or Firm* — Jason P. McDevitt

(57) ABSTRACT

Carbon nanoflakes, methods of making the nanoflakes, and applications of the carbon nanoflakes are provided. In some embodiments, the carbon nanoflakes are carbon nanosheets, which are less than 2 nm thick. The carbon nanoflakes may be made using RF-PECVD. Carbon nanoflakes may be useful as field emitters, for hydrogen storage applications, for sensors, and as catalyst supports.

11 Claims, 36 Drawing Sheets

U.S. PATENT DOCUMENTS

| | | | |
|---|---|---|---|
| 6,361,861 B2* | 3/2002 | Gao et al. | 428/367 |
| 6,872,330 B2 | 3/2005 | Mack et al. | |
| 7,071,258 B1 | 7/2006 | Jang et al. | |
| 7,623,340 B1 | 11/2009 | Song et al. | |
| 2003/0175462 A1 | 9/2003 | Nishino et al. | |
| 2003/0185741 A1 | 10/2003 | Matyjaszewski et al. | |
| 2003/0224168 A1* | 12/2003 | Mack et al. | 428/408 |
| 2004/0253167 A1* | 12/2004 | Silva et al. | 423/447.1 |
| 2007/0158618 A1 | 7/2007 | Song et al. | |
| 2007/0258192 A1 | 11/2007 | Schindall et al. | |
| 2008/0212261 A1 | 9/2008 | Ajayan et al. | |
| 2008/0232028 A1 | 9/2008 | Zhao | |
| 2009/0011204 A1 | 1/2009 | Wang et al. | |

OTHER PUBLICATIONS

Wu et al., Adv. Mater. 2002, 14, No. 1, Jan. 4, pp. 64-67.*
Affoune et al., "Experimental evidence of a single nano-graphene," J. Chem. Lett., 2001, vol. 348, pp. 17-20.
Aizawa et al., "Bond softening in monolayer graphite formed on transition-metal carbide surfaces," Phy. Rev. B, 1990, vol. 42, pp. 11469-11478.
Al-Jishi et al., Phys. Rev. B., 1982, vol. 26, pp. 4514-4522.
Andersson et al., "Structure and electronic properties of graphite nanoparticles," Phys. Rev. B., 1998, vol. 58, pp. 16387-16385.
Ando et al., "Preparation of carbon nanotubes by arc-discharge evaporation," Japanese Journal of Applied Physics, Part 2: Letters, 1993, vol. 32, pp. L107-L109.
Ando et al., "Production of petal-like graphite sheets by hydrogen arc discharge," Carbon, 1997, vol. 35, pp. 153-158.
Baughman et al., Science, 2002, vol. 297, pp. 787-792.
Bonard et al., Solid-State Electron., 2001, vol. 45, pp. 893-914.
Chen et al., "Exfoliation of graphite flake and its nanocomposites," Carbon, 2003, vol. 41, pp. 619-621.
Chen et al., "Preparation and characterization of graphite nanosheets from ultrasonic powdering technique," Carbon, 2004, vol. 42, pp. 753-759.
Chen et al., "Preparation of polystyrene/graphite nanosheet composite," Polymer, 2003, vol. 44, pp. 1781-1784.
Chung et al., Diamond and Related Materials, 2001, vol. 10, pp. 248-250.
Deckman et al., Appl. Phys. Lett., 1982, vol. 41, pp. 377-379.
Deckman et al., J. Vac. Sci. Technol. B, 1983, vol. 1, pp. 1109-1112.
Deckman et al., J. Vac. Sci. Technol. B, 1988, vol. 6, pp. 333-336.
Dresselhaus et al., Adv. Phys., 2000, vol. 49, pp. 705-814.
Ebbesen et al., "Large-scale synthesis of carbon nanotubes," Nature, 1992, vol. 358, pp. 220-222.
Ferrari et al., "Interpretation of Raman spectra of disordered and amorphous carbon," Phys. Rev. B, 2000, vol. 61, pp. 14095-14107.
Gonzalez et al., "Electron-electron interactions in grapheme sheets," Phys. Rev. B, 2001, vol. 63, pp. 134421/1-134421/8.
Gröning et al., Solid-State Electron, 2001, vol. 45, pp. 929-944.
Hass, K.C., Phys. Rev. B., 1992, vol. 46, pp. 139-150.
Holloway, Brian C., "Carbon Nanostructures—New Morphologies of an Old Element,"BCHPNNL Presentation, Jun. 14, 2004, 43 pgs.
Huang et al., "Growth of large periodic arrays of carbon nanotubes," Appl. Phys. Lett., Jan. 20, 2003, vol. 82, No. 3, pp. 460-462.
Hulteen et al., J. Phys. Chem. B, 1999, vol. 103, pp. 3854-3863.
Hulteen et al., J. Vac. Sci. Technol. A, 1995, vol. 13, pp. 1553-1558.
Iijima et al., "Structures of carbon soot prepared by laser ablation," J. Phys. Chem., 1996, vol. 100, pp. 5839-5843.
Jishi et al., Chem. Phys. Lett., 1993, vol. 209, pp. 77-82.
Jung et al., Appl. Surf. Sci., 2002, vol. 193, pp. 129-137.
Kuang et al., "Low temperature solvothermal synthesis of crumpled carbon nanosheets," Carbon, 2004, vol. 42, pp. 1737-1741.
Kusakabe et al., "Indication of flat-band magnetism in theoretically designed nanographite with modified zigzag edges," Journal of Magnetism and Magnetic Materials, 2004, vol. 272-276, pp. E737-E738.
Kusakabe et al., Phys. Rev. B: Condensed Matter and Materials Physics, 2003, vol. 67, pp. 092406 (abstract).
Lespade et al., "Model for raman scattering from incompletely graphitized carbons," Carbon, 1982, vol. 20, pp. 427-431 (abstract).
Lieberman et al., Principles of plasma discharges and materials processing, New York, Wiley, 1994, pp. 387-411.
Lim et al., J. Non-Cryst. Solids, 2002, vol. 864, pp. 299-302.
Makarova et al., "Magnetic properties of carbon structures, Semiconductors," (Translation of Fizika i Tckhnika Poluprovodnikov (Saqkt-Peterburg)), 2004, vol. 38, pp. 615-638.
Michaelson, H.B., J. Appl. Phys., 1949, vol. 21, pp. 536-540.
Milne et al., Diamond Relat. Mater., 2001, vol. 10, pp. 260-264.
Nakada et al., "Edge state in grapheme ribbons: nanometer size effect and edge shape dependence," Phys. Rev. B, 1996, vol. 54, pp. 17954-17961.
Nemanich et al., "First- and second-order Raman scattering from finite-size crystals of graphite," Phys. Rev. B, 1979, vol. 20, pp. 392-401.
Nemanich et al., Mater. Sci. Eng., 1977, vol. 31, pp. 157-160.
Nicklow et al., "Lattice dynamics of pyrolytic graphite," Phys. Rev. B., 1972, vol. 3, No. 5, pp. 4951-4962.
Obraztsov et al., "Electron field emission and structural properties of carbon chemically vapor-deposited films," Diamond and Related Materials, 1999, vol. 8, pp. 814-819.
Obraztsov et al., "Field emission characteristics of nanostructured thin film carbon materials," Appl. Surf. Sci., 2003, vol. 215, pp. 214-221.
Oshima et al., "Surface phonon dispersion curves of graphite (0001) over the entire energy region," Solid State Comm., 1988, vol. 65, pp. 1601-1604 (abstract).
Oshiyama et al., "Prediction of electronic properties of carbon-based nanostructures," Physica B, 2002, vol. 323, pp. 21-29.
Paillard et al., Phys. Rev. B, 1994, vol. 49, pp. 11433-11439.
Park et al., J. Vac. Sci. Technol. B, 2003, vol. 21, pp. 562-566.
Peigney et al., "Specific surface area of carbon nanotubes and bundles of carbon nanotubes," Carbon, 2001, vol. 39, pp. 507-514.
Pfeiffer et al., Appl. Phys. Lett., 2003, vol. 82, pp. 4149-4150.
Prasad et al., "Heat-treatment effect on the nanosized graphite $[\pi]$-electron system during diamond to graphite conversion," Phys. Rev. B., 2000, vol. 62, pp. 11209-11218.
Prawer et al., Chem. Phys. Lett., 2000, vol. 332, pp. 93-97.
Rao et al., Science, 1997, vol. 275, pp. 187-191.
Raravikar et al., Phys. Rev. B, 2002, vol. 66, pp. 234424/1-235424/9.
Robertson, J., J. Vac. Sci. Technol. B, 1995, vol. 17, pp. 659-665.
Saito, Y., J. Nanosci. Nanotechnol., 2003, vol. 3, pp. 39-50.
Shang et al., "Uniform carbon nanoflake films and their field emissions," J. Chem. Lett., 2002, vol. 358, pp. 187-191.
Solin, S.A., Physica B&C, 1980, vol. 99, pp. 443-452 (abstract).
Tuinstra et al., "Raman spectrum of graphite," J. Chem. Phys., 1970, vol. 53, pp. 1126-1130.
Viculis et al., A chemical route to carbon nanoscrolls, Science, 2003, vol. 299, p. 1361.
Wakabayashi et al., "Electronic and magnetic properties of nanographite ribbons," Phys. Rev. B, 1999, vol. 59, pp. 8271-8282.
Wang et al., "Free-standing subnanometer graphite sheets," Applied Physics Letters, Aug. 16, 2004, vol. 85, No. 7, pp. 1265-1267.
Wang et al., "Synthesis and field-emission testing of carbon nanoflake edge emitters," J. Vac. Sci. Technol. B, May/Jun. 2004, vol. 22, No. 3, pp. 1269-1272.
Wang et al., "Synthesis of carbon nanosheets by inductively coupled radio-frequency plasma enhanced chemical vapor deposition," Carbon, 2004, pp. 1-6.
Winzer et al., Appl. Phys. A: Mater. Sci. Process., 1996, vol. 63, pp. 617-619 (abstract).
Wu et al., "Carbon nanowalls and related materials," Journal of Materials Chemistry, 2004, vol. 14, pp. 469-477.
Wu et al., "Carbon Nanowalls Grown by Microwave Plasma Enhanced Chemical Vapor Deposition," Advanced Materials, Jan. 4, 2002, pp. 64-67.
Yue et al., Appl. Phys. Lett. 2002, vol. 81, No. 2, pp. 355-357.
Zhu et al., "Nitrogen Doped Carbon Nanoflakes Synthesized by RFI PECVD on Patterned Nickel Catalyst Layer," 2003 Poster, AVS 03 Baltimore, MD, 1 page.
Zhu et al., Appl. Phys. Lett., 1999, vol. 75, pp. 873-875.
Zhu et al., Science, 1998, vol. 282, pp. 1471-1473.
Zhu et al., Solid-State Electron., 2001, vol. 45, pp. 921-928.

French, B.L., et al., "Structural Characterization of Carbon Nanosheets via X-Ray Scattering", *Journal of Applied Physics*, 97, 114317-1 (2005).

J. Schindall, "The Charge of the Ultra-Capacitors"—*IEEE-Spectrum*—Nov. 2007 retrieved from www.spectrum.ieee.org.

Yeh, Ted, Thesis "The Ultracapacitor Characterization of Functionalized Graphene Sheets," Apr. 2006, Princeton University, 62 pages.

Zhao, Xin, Poster—"Application of Carbon Nanosheets in Supercapacitors", Presented at 2007 Virginia Innovation Showcase.

Zhao, X. et al., "Thermal Desorption of Hydrogen from Carbon Nanosheets", *Journal of Chemical Physics*, 124, 194704 (2006).

Non-Final Office Action mailed Sep. 19, 2009, in copending U.S. Appl. No. 11/976,574 (US 2008/0232028), 28 pages.

The Final Office Action and Notice of References related U.S. Appl. No. 11/976,574.

Geim, et al., "Graphene: Exploring carbon flatland", *Physics Today*, 2007, pp. 35-41.

M. Wilson, "Electrons in Atomically Thin Carbon Sheets Behave like Massless Particles", *Physics Today*, 2006, pp. 21-23.

Rao, et al., "A study of the synthetic methods and properties of graphenes", *Sci. Technol. Adv. Mater.*, vol. 11, pp. 1-15, Published: Oct. 27, 2010.

Scientific Background on the Nobel Prize in Physics 2010-Graphene-compiled by the Class for Physics of the Royal Academy of Sciences, Oct. 5, 2005, Kungl Vetenskaps Akademien-The Royal Swedish Academy of Sciences, pp. 1-10.

\* cited by examiner

Latex Nanosphere Double-Layer Pattern

Intersphere hole spacing:
$$d_{DL} = D$$

Intersphere hole equivalent diameter:
$$\phi_{DL} \approx \left[ \frac{4}{\pi} \cdot 6 \cdot \frac{1}{2} \cdot \frac{0.155}{2} \cdot 2 \cdot tg30 \cdot \frac{0.155}{2} \right]^{\frac{1}{2}} D \approx 0.16D$$

| D, nm | 419 | 269 | 171 | 100 |
|---|---|---|---|---|
| $d_{SL}$, nm | 241 | 155 | 99 | 58 |
| $?_{SL}$, nm | 66 | 43 | 27 | 16 |

Annealing of Ni Nanoscale Patterns - I
Single-layer latex mask $H_2$, 70 mTorr, 660 C, without plasma

Ni Pattern via E-Beam Evaporation
(20 nm, latex-419 mask)

Latex removed by $CH_2Cl_2$ or mechanical method

~ 150 nm ($\phi_{SL}$=96 nm)

Schematic of RF-CVD System

CARBON NANOSTRUCTURES AND METHODS OF MAKING AND USING THE SAME

CROSS-REFERENCE TO RELATED PATENT APPLICATIONS

This application is a National Stage application of PCT/US2004/032585, filed Oct. 4, 2004, which claims priority from U.S. Provisional Application Ser. No. 60/508,675, filed Oct. 3, 2003. The entire contents of each of the aforementioned applications are incorporated herein by reference.

STATEMENT REGARDING FEDERALLY SPONSORED RESEARCH OR DEVELOPMENT

The U.S. Government may have certain rights in this invention pursuant to grant number N00014-02-1-0711 and N00014-03-1-1605 from the Office of Naval Research.

BACKGROUND OF THE INVENTION

Graphite, diamond, diamond-like carbon, amorphous carbon, fullerenes, carbon nanotubes, and carbon nanofibers are attractive for their diverse forms and remarkable properties, and have tremendous applications in almost all mechanical, physical, chemical, electrochemical, microelectronic fields.

Work has been done to form plate-like carbon structures on the nanoscale. The first attempts used intercalation techniques to exfoliate graphite plates. While this process has had some success, it still has the significant drawbacks, such as (1) the graphite plates exist within a wide distribution of particles of different thicknesses which can not be separated; (2) the graphite plates are contaminated by the intercalation compounds used in the exfoliation process; and (3) the graphite plates cannot be oriented on a surface to provide large specific surface area structures and freestanding nanometer edges. This makes them less than ideal for research studies and practical applications.

SUMMARY OF THE INVENTION

One embodiment of the invention provides a carbon nanosheet having a thickness of 2 nanometers or less.

One embodiment of the invention provides a composition comprising a carbon nanoflake having a specific surface area between 1000 $m^2/g$ and 2600 $m^2/g$.

One embodiment of the invention provides a method of making carbon nanoflakes comprising forming the nanoflakes on a substrate using RF-PECVD.

One embodiment of the invention provides a method of making carbon nanosheets, comprising forming the nanosheets on a substrate and increasing the substrate temperature during a nucleation phase of carbon nanosheet formation.

One embodiment of the invention provides a field emitter comprising carbon nanosheets.

One embodiment of the invention provides a catalyst support comprising carbon nanosheets.

One embodiment of the invention provides a hydrogen storage device comprising carbon nanoflakes.

One embodiment of the invention provides a sensor comprising the nanoflakes.

One embodiment of the invention provides a blackbody absorber comprising the nanoflakes.

One embodiment of the invention provides a composite material comprising the nanoflakes.

One embodiment of the invention provides a method of making coated carbon nanoflakes comprising providing carbon nanoflakes coated with a metal coating and reacting the nanoflakes and the coating to convert the metal coating to a metal carbide coating.

BRIEF DESCRIPTION OF THE DRAWINGS

FIG. 5 shows SEM top-view images of typical nanosheets.

FIG. 8 shows HRTEM images of typical nanosheets.

FIG. 10 shows SEM plan-view images of typical nanosheets coated with 1 nm Pt by electron beam evaporation.

FIG. 26 shows SEM images of carbon nanosheets grown on various substrates.

FIG. 27 shows typical individual nanosheets of the sample shown in FIG. 14(B).

FIG. 31 shows generic SEM representations of CNF after ZrC formation.

DETAILED DESCRIPTION OF THE PREFERRED EMBODIMENTS

The embodiments of the present invention provide carbon nanoflake (CNF) form carbon nanostructures, methods of making these carbon nanoflake nanostructures, and methods of using the carbon nanoflake nanostructures. The CNF can come in a variety of forms as discussed in detail herein. Generally speaking, the CNF are sheet-like forms of graphite of varying dimensions. As used herein, "carbon nanosheet" ("CNS") refers to a carbon nanoflake with a thickness of 2 nanometers or less. These carbon nanosheets are two-dimensional graphite sheets made up of a single to several graphene layers.

Unless otherwise noted, the terms "a", "an", or "the" are not necessarily limited to one and may refer to more than one. For example, "a carbon nanoflake" may refer to two or more carbon nanoflakes. Unless otherwise noted, the term "between" followed by a number range is inclusive of the endpoints. For example, the phrase "between 20 and 200" means 20, 200, and anything in between those two endpoints.

Carbon Nanoflakes—Structure and Characteristics

CNF refers to a broad range of carbon nanostructures. Generally, these CNF are sheet-like forms of graphite. CNF have a thickness of 10 nanometers or less. In some embodiments, the thickness is 5 nanometers or less, such as 2 nanometers or less, and preferably 1 nanometer or less. CNF with thicknesses of 2 nanometers or less may be referred to as "nanosheets" or "CNS". The thickness of CNS can vary from a single graphene layer to two, three, four, or more layers. CNF have a height ranging from 100 nanometers to up to 8 μm. In some embodiments, CNF will have a height of 100 nm to 500 nm, such as 100 nm to 2 μm, or in some embodiments between 2.5 μm and 8 μm, such as 2.5 μm to 5 μm.

One of ordinary skill in the art may desire different thicknesses and heights of CNF depending on the intended application. For example, smaller thicknesses, such as 1 nm or less, are preferred for applications exploiting the magnetic or field emission properties of CNF. In addition, CNF with thicknesses of 2 nanometers or less are typically preferred when the CNF are used as catalyst supports.

Figure 1:
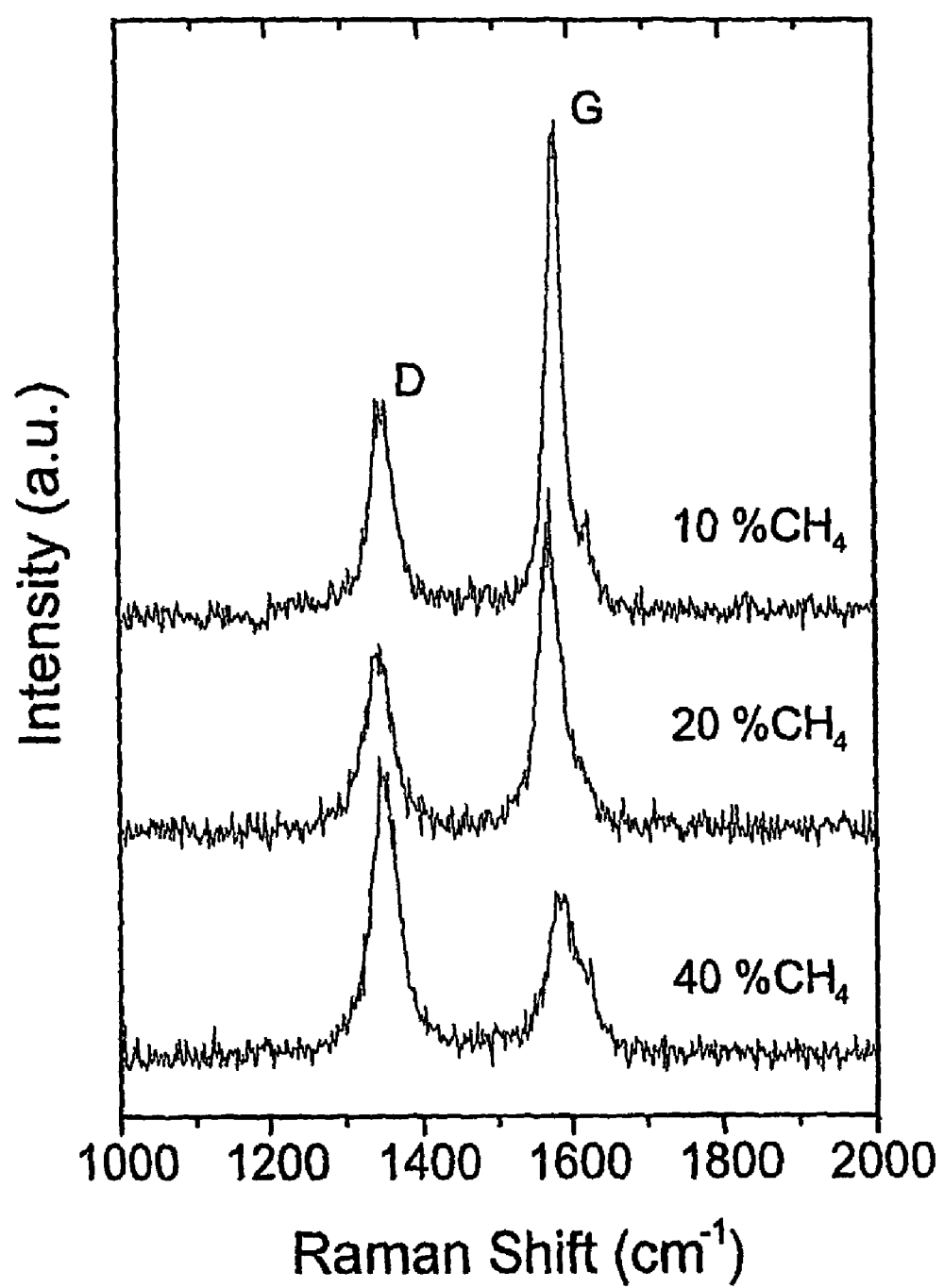
FIG. 1 shows the Raman spectra from carbon nanoflakes grown at different $CH_4$ concentrations.
Figure 2A:
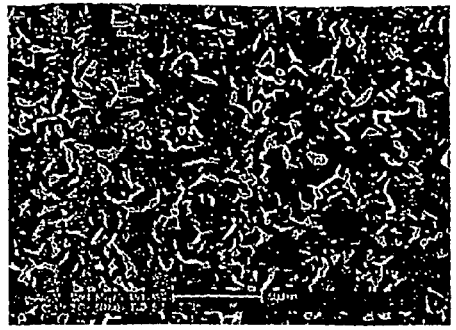
FIG. 2 shows: (A) secondary electron (SE) images of carbon nanoflakes grown at 20% $CH_4/(CH_4+H_2)$ on Ni patterns from single-layer nanosphere masks, (B) back-scattered electron (BSE) images at the same region as (a), (c) SEM images of carbon nanoflakes grown at 40% $CH_4/(CH_4+H_2)$ on Ni patterns from double-layer nanosphere masks, (d) BSE images at the same region as (c), and (e) enlarged image of the carbon nanoflakes grown at 40% $CH_4/(CH_4+H_2)$. Other deposition parameters are: RF power 900 W, temperature 680° C., pressure 70-90 mTorr, deposition duration 5 minutes.
Figure 2D:
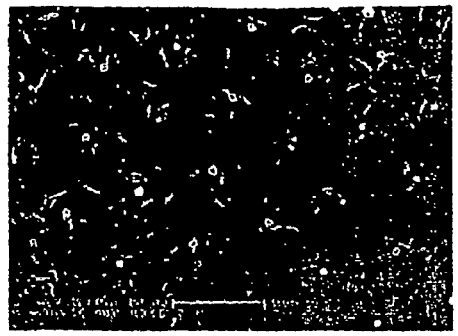
Figure 2B:
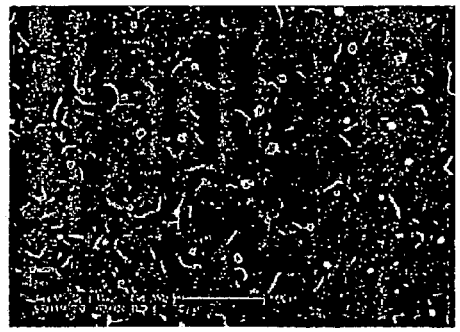
Figure 2E:
Figure 2C:
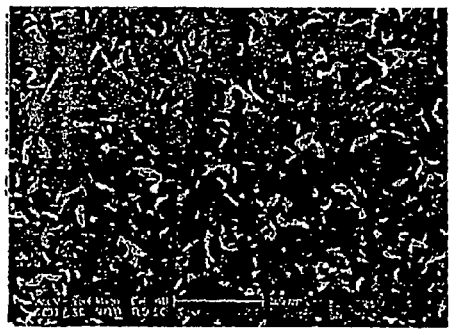

CNF synthesized using nanosphere lithography techniques, which techniques are discussed in detail below, were examined using Raman spectroscopy. Raman spectroscopy is a standard nondestructive tool for the structural characterization of different carbon materials. Though there was some catalyst, i.e., nickel, and amorphous carbon impurities in the samples, structural information can still be extracted. FIG. 1 shows the Raman spectra from carbon nanoflakes grown at different $CH_4$ concentrations. Two main features in the Raman spectra are the D (1350 $cm^{-1}$) and G (1580 $cm^{-1}$) peaks, and are usually assigned to nanocrystalline graphite associated with structural defects and perfect crystalline graphite, respectively. The sharp D and G peaks indicate the crystalline but defective nature of the CNF. The defects may include vacancies and distortions of graphene sheets that lead to the non-uniformity, corrugation, and twisting shown in FIG. 2. The shoulder of the G peak at 1620 $cm^{-1}$ is also likely indicative of peak splitting from crystalline graphite. The carbon nanoflakes synthesized with higher $CH_4$ concentrations show stronger D peaks, while the sharp G peak and weak D peak are characteristic of lower $CH_4$ concentrations, i.e., 10% $CH_4$. Thus, lower $CH_4$ concentrations appear to facilitate the growth of more "crystalline" CNF with less structural defects compared to CNF synthesized at higher $CH_4$ concentrations. The strong D peak usually indicates an even more nanocrystalline structure and the presence of a large amount of defects. The most likely candidates for the defects are the amorphous carbon and/or some highly distorted structures. Other likely defects occurring in the CNF include non-6 member ring defects, i.e., 4, 5, and 7 member rings, edge defects (termination defects), and structural defects, such as corrugation.

Figure 3:
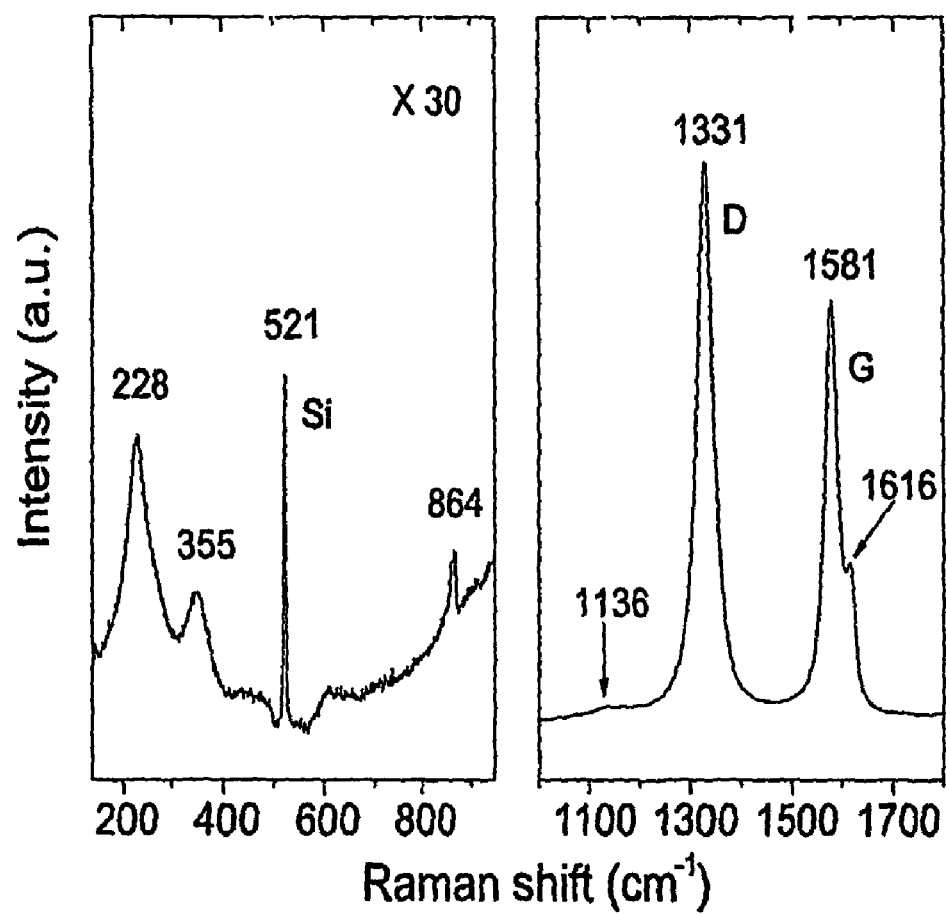
FIG. 3. shows a Raman spectrum from a typical carbon nanosheet sample. The peak located at 521 $cm^{-1}$ is from the Si substrate.

FIG. 3 is another Raman spectrum obtained from a carbon nanosheet (CNS) sample. The spectrum shown in FIG. 3 indicates that carbon nanosheets have a smaller thickness but are very similar or the same in structure in composition compared to carbon nanoflakes with thicknesses greater than 2 nm, such as those shown in FIG. 2. The weak peak at 1136 $cm^{-1}$ has previously been assigned to nanodiamond or, more recently, possible edge structures of trans-polyacetylene. The presence of the 1136 $cm^{-1}$ peak in nanosheet samples is consistent with the high density of edges. This is important, because calculations suggest hydrogenated graphene nanoribbons may have spontaneous magnetism due to edge effects on the band structure. Thus, CNS may exhibit spontaneous magnetism, in some embodiments.

Figure 5A:
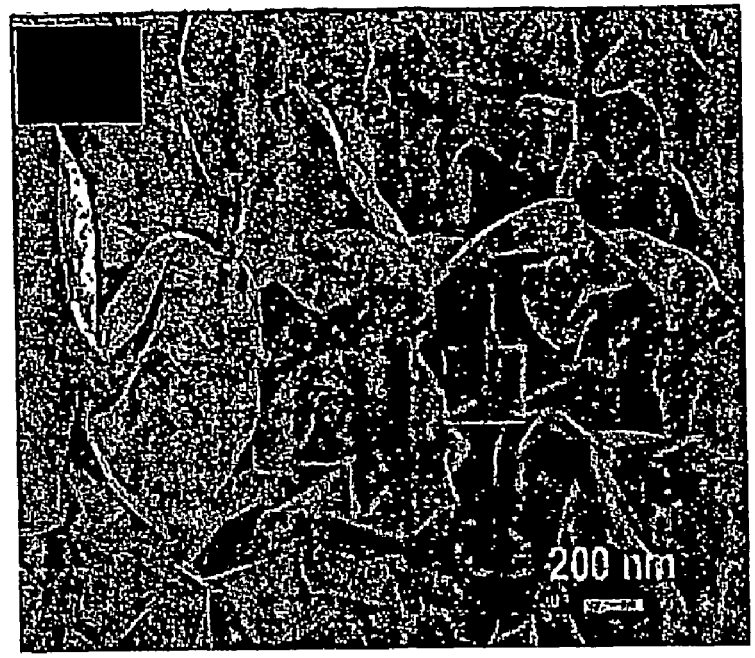
FIG. 5(A) shows the general morphology of nanosheets.
Figure 5B:
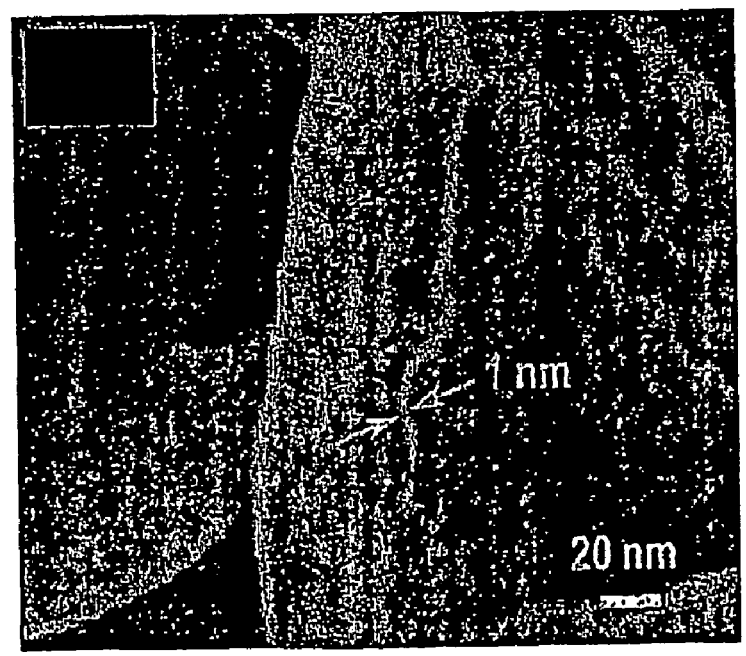
FIG. 5(B) shows individual nanosheets in the frame area of a low magnification image.

FIG. 3 also shows three well-resolved peaks at 228, 355 and 864 $cm^{-1}$, which have not been observed in bulk or carbon materials with thicknesses greater than 10 nm. As the thickness of the crystal nanosheets decreases to a few atom layers, the confinement in the stacking direction (c-axis) will decrease. This may result in the larger stacking spacing shown in FIG. 8, described below, and also activate and/or shift vibrational modes from the lattice dynamic point of view. For example, the 228 and 355 $cm^{-1}$ peaks may be analogous to the radial breathing modes of single-walled carbon nanotubes, which arise from the periodicity imposed by wrapping a single graphene sheet into a finite-size (small diameter) tube. Carbon nanosheets may show similar behavior, since, as shown in FIG. 5, they are folded/corrugated with a small radius of curvature and have a high density of sharp ridges. The narrow, weak peak at 864 $cm^{-1}$ has been reported in nanotube studies and assigned to an in-plane vibrational mode. However, previous theoretical studies indicate that graphite has an infrared-active out-of-plane mode around this frequency. This mode may become Raman-active because of the presence of a large number of sheet edges and defects which disrupt the graphene plane symmetry. These are possible explanations but are not meant to be limiting explanations of the data.

Work function and field emission tests of the carbon nanoflakes prepared using Ni catalyst on a Si substrate were taken by Kelvin probe and diode I-V measurements. The work function given by Kelvin probe measurement is about 4.3 eV, which is near that of graphitic carbon (4.39 eV). The carbon nanoflakes have a high density of sharp graphitic edges, which are potential sites for field emission.

Figure 6:
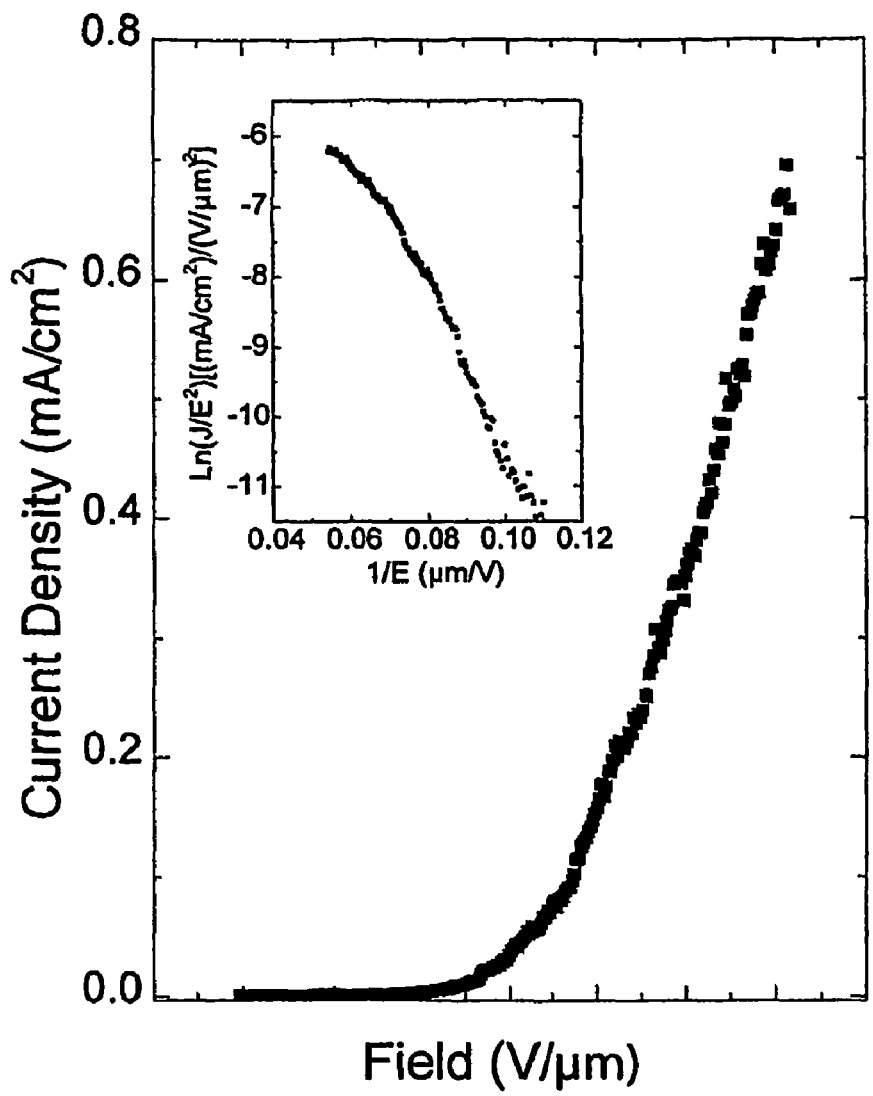
FIG. 6 shows a field emission I-E curve from carbon nanoflakes synthesized using a Si substrate and Ni catalyst. The inset is the corresponding Fowler-Nordheim plot. Deposition parameters are as follows: RF power 900 W, 40% $CH_4/(CH_4+H_2)$, temperature 680° C., pressure 90 mTorr, deposition duration 5 minutes.
Figure 7:
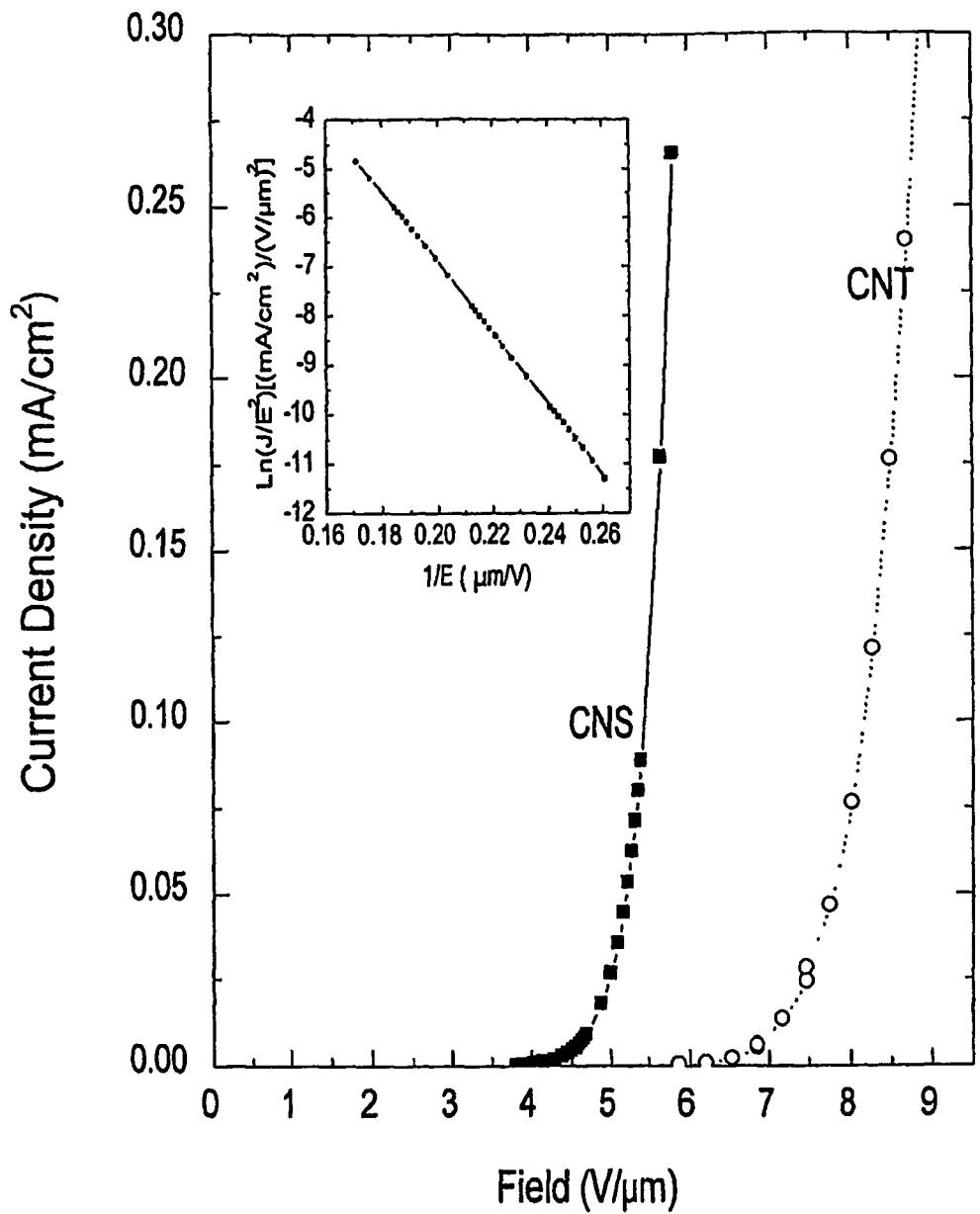
FIG. 7 shows a J-E curve from nanosheets (CNS) grown on a Si substrate. Inset is the corresponding Fowler-Nordheim plot. A J-E curve from a carbon nanotube sample (CNT) is also shown for comparison.

FIG. 6 shows the current density (I) v. electric field (E) characteristics of a nanoflake film grown on Si substrate using Ni catalyst. The inset is the corresponding Fowler-Nordheim plot. This data shows a current density of 0.6 $mA/cm^2$ at 18 V/m, which is comparable to some carbon nanotubes and nanostructures. FIG. 7 shows the current density (J) v. electric field (E) characteristics of a typical carbon nanosheet sample compared to a similar curve for carbon nanotubes. The inset is the corresponding Fowler-Nordheim (F-N) plot for the nanosheet sample. The turn-on field, 4.7 V/$\mu$m, at threshold of 10 $\mu A/cm^2$, approaches the best values observed from carbon nanotubes and is substantially lower than most of other materials. The linear F-N plot suggests that the field emission from carbon nanosheets has a metallic behavior and follows the conventional tunneling mechanism.

Figure 4:
FIG. 4 shows an HRTEM image of a single graphene-layer carbon nanosheet. Single layer sheets made a predominate number of the overall sample. Samples were grown directly on NI and Cu TEM grids.

FIGS. 4 and 5 show SEM images of examples of CNF structures. FIG. 4 shows that the CNF are about 1000 nm high standing roughly vertically to the substrate, i.e., on their edges, and have a smooth surface topography and corrugated nature. FIG. 5 demonstrates that the thickness of the individual CNF is about 1 nanometer making them CNS, in some embodiments. In fact, the CNS may be even thinner, because the image is limited by the SEM resolution. The overall translucent appearance of these CNS confirms the thin, uniform thickness along the entire CNS.

Auger electron spectroscopy (AES) and X-ray photoelectron spectroscopy (XPS) indicate that the CNS surfaces are predominately carbon with a small amount of oxygen, probably from adsorbed water on the surface. More importantly, the AES carbon peak shows the typical features associated with graphite rather than the dolphin peak associated with disordered or amorphous carbon. The results of Fourier transform infrared spectroscopy (FTIR) indicates a C=C$\pi$ vibration at about 1620 $cm^{-1}$ and a large C—H stretch absorption at about 2900 $cm^{-1}$, which is expected since $CH_4$ diluted in $H_2$ was used as the carbon source during synthesis, as described in detail below. Thus, most or all of the CNF, and CNS specifically, have graphite rather than amorphous structure. Thus, the CNF are substantially pure in composition, because they contain pure graphite with some amorphous regions and absorbed water or oxygen on the surface. Preferably, the CNF contain no other impurities but may contain 0-1% Si in some cases and still be considered "substantially pure."

Figure 8A:
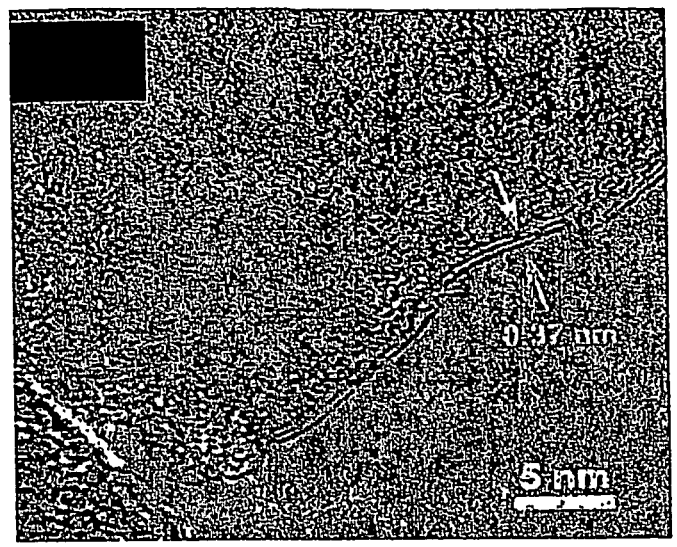
FIG. 8(A) shows a planar nanosheet on a lacey carbon grid (lower-left corner).
Figure 8B:
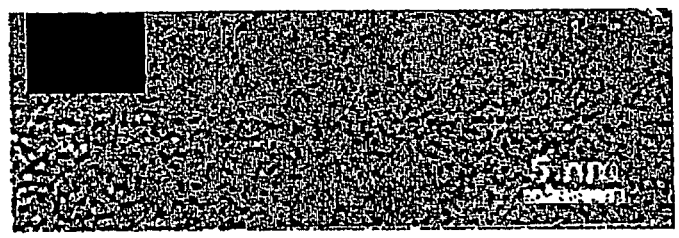
FIG. 8(B) shows a horizontal fringe indicating the existence of a single graphene sheet.
Figure 8C:
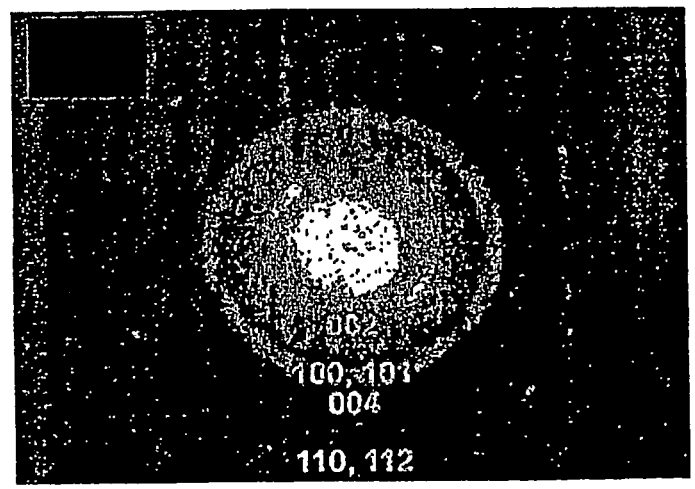
FIG. 8(C) shows an electron diffraction pattern from folded and overlapped nanosheets indexed on graphite spacing.

FIG. 8 illustrates even thinner CNS having a thickness of 1 to 3 monolayers. High resolution transmission electron microscopy confirms the thickness of the CNS and also gives some indication to their structure. The fringes in FIG. 8(A), which are separated by about 0.37 nm, are evidence that the CNS depicted consist of three graphene layers. The layer spacing is, however, considerably larger than the spacing (0.34 nm) of the 002 plane of bulk graphite. The single fringes shown in FIG. 8(B), which are attributed to single-layer nanosheets, are also regularly observed. Electron diffraction from nanosheets (FIG. 8(C)) matches a graphite pattern with a 002 spacing of 0.364 nm, in agreement with that of TEM images. The large inter-layer spacing suggests a significant reduction of the van der Waals interaction between the graphene layers. Reduced van der Waals interactions could lead to improved understanding of single graphene layers as well as the fundamental nature of graphite intercalation. The large inter-layer spacing may allow more space for the incorporation of other materials. For example, the larger inter-layer spacing may allow for improved hydrogen capacity for hydrogen storage applications, greater catalyst capacity for catalyst support applications, more space for metal for battery electrode applications, and more space for materials in sensor applications.

Figure 9:
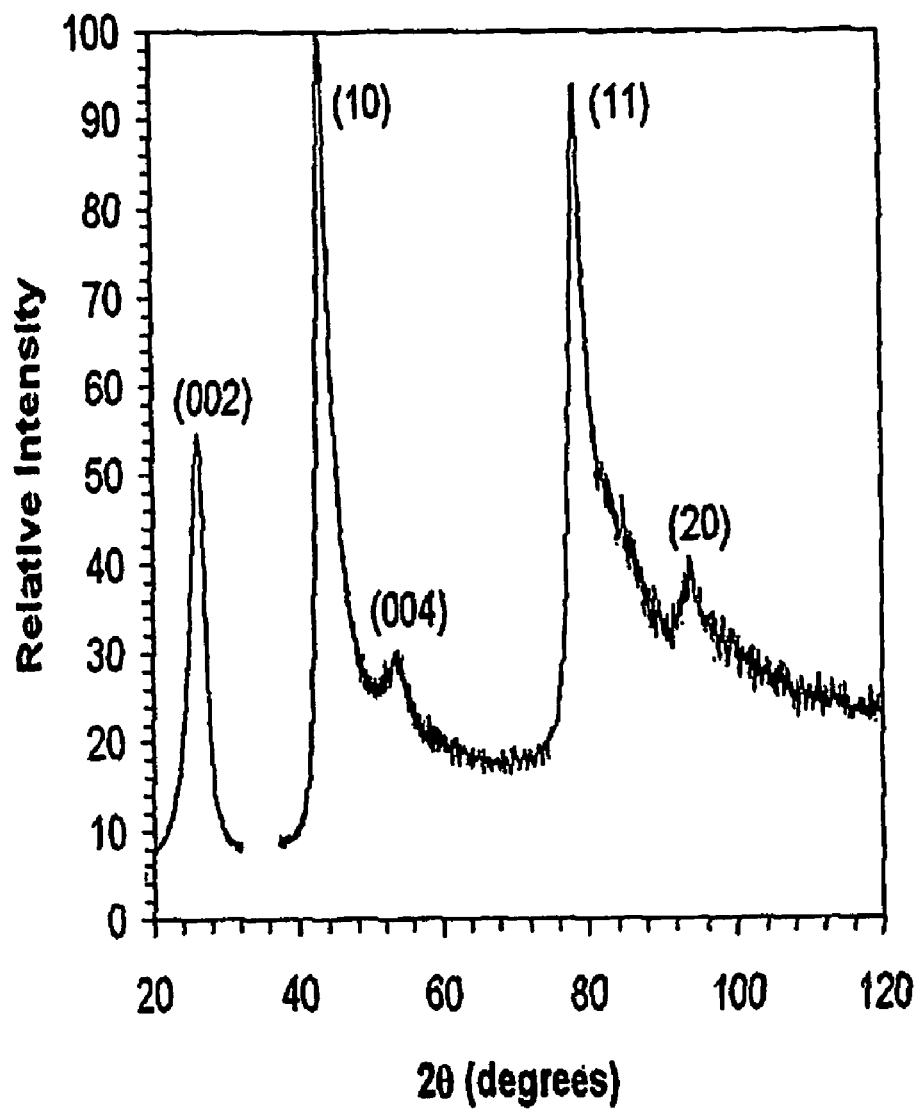
FIG. 9 shows XRD pattern from a typical nanosheet sample with graphite reflection indices labeled. The asymmetrically-shaped (10), (11), and (20) peaks are characteristic of a turbostratic, 2-dimensional microstructure, and are thus labeled only with (hk) indices. The large breadth of the (002) and (004) peaks indicate a range of sheet-thicknesses, from single graphene layers to stacks of more than 15.

The graphitic structure of carbon nanosheets of FIG. 5 was confirmed by X-ray diffraction (XRD) spectra shown in FIG. 9. The XRD spectrum from a typical 9 $cm^2$ carbon nanosheet sample can be well indexed to the graphite spectral features. The low intensity ratio of (002) to (100) and the large FWHM of the diffraction peaks are both expected due to the thin nature of the nanosheets and the vertical growth orientation.

The CNF exhibit the surprising and useful property of having a high specific surface area. Specifically, the CNF have specific surface areas ranging from 1000 $m^2/g$ to 2600 $m^2/g$ as calculated by Brunauer-Emmett-Teller (BET) measurements obtained from Clear Science Inc. (www.clearsci.com). This large specific surface area makes the CNF ideal tools for applications, such as sensors, hydrogen storage, catalyst supports and other applications where high specific surface areas are considered advantageous.

A typical carbon nanosheet sample has a specific surface area of 1300±300 $m^2/g$ (the large standard deviation of the electronic balance used lead to the large spread in the specific surface area). This is almost the same as the theoretical value for an ideal double layered graphene structures, 1315 m$^2$/g. In addition, this measurement is within the uncertainty limits of the calculated value of single-walled carbon nanotubes and is equal to or higher than the typical specific surface area of activated charcoal (1000 m$^2$/g). The surface area varies between samples. One sample of CNS has a specific surface area of 2300±300 m$^2$/g. Considering that carbon nanosheet structure can be readily grown on various types of substrates as discussed in detail below, such as Si, Al$_2$O$_3$, Ni, Ti, Cu, Ag, Au (including their alloys) and stainless steel, it has great potential for sensor, catalyst support, hydrogen storage, and other high specific surface area applications.

Figure 10A:
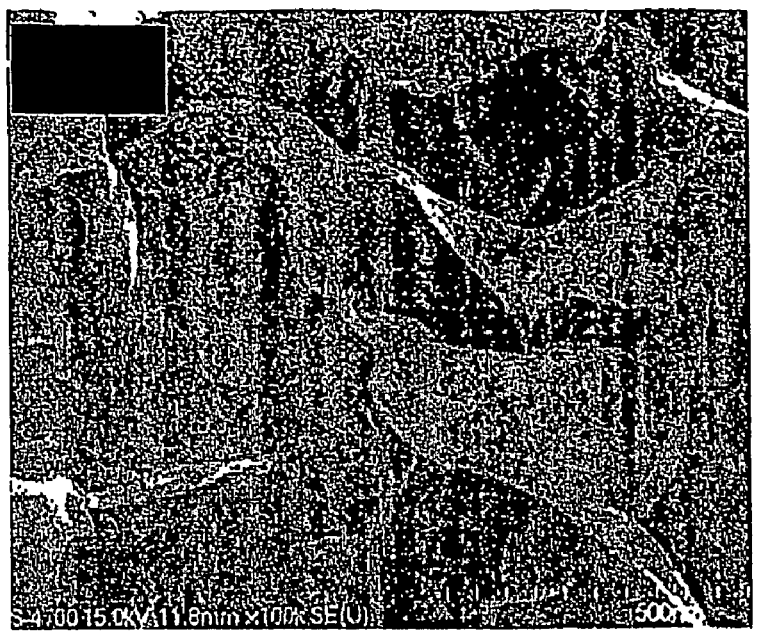
FIG. 10(A) shows the general morphology of the nanosheets.
Figure 10B:
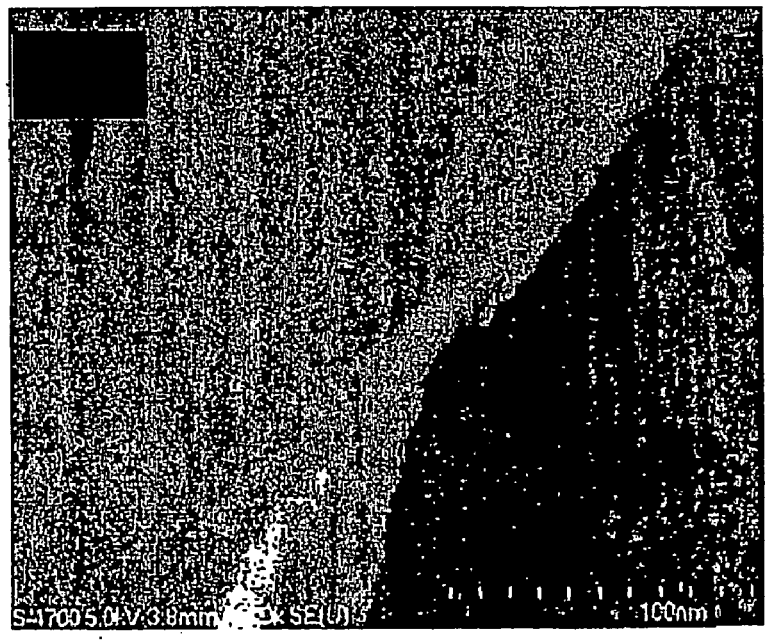
FIG. 10(B) shows an individual nanosheet at higher magnification. Note the uniform distribution of Pt nanoparticles on the sheet surface.
Figure 11:
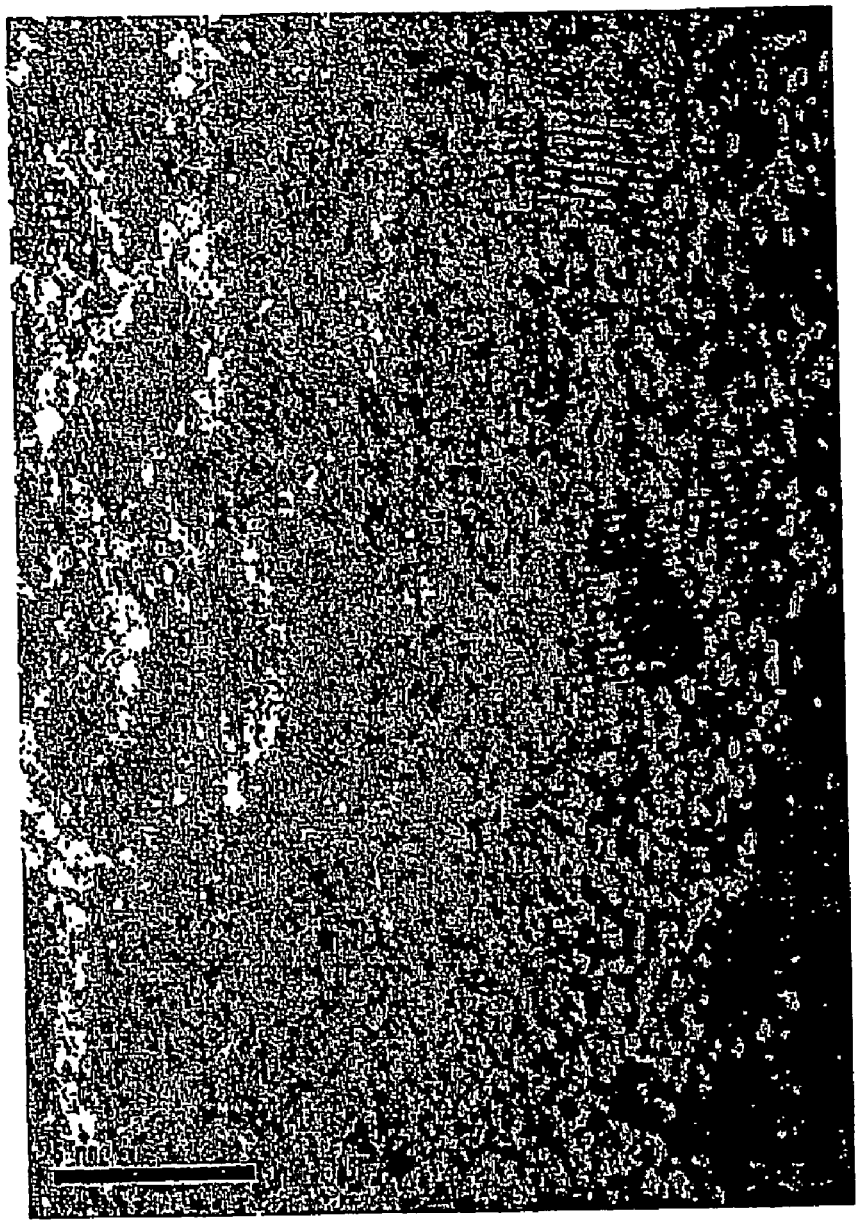
FIG. 11 shows an HRTEM image of Pt nanoparticles on carbon nanosheets.

The carbon nanoflakes may be coated with different materials, such as metals, including Pt, Ni, Ti, Zr, Hf, V, Nb and Ta and alloys thereof and non-metals, such as ZrC and metal oxides. In one embodiment, carbon nanosheet surfaces may be coated with a 1-2 nm layer of these metals by electron beam evaporation. FIG. 10 shows the SEM images of carbon nanosheets coated with 1 nm thick Pt. The deposited metal formed nanoscale particles or nanoparticles which have a high packing density and are uniformly distributed over the entire sheet surface. Though the metal layers were thicker than the nanosheets, no agglomeration was observed. A high-resolution TEM image of the Pt-coated CNS sample, FIG. 11, shows that the Pt nanoparticles are 2-3 nm in diameter, which is the ideal size for fuel cell applications, such as fuel cell electrode applications. In one embodiment, CNF were grown on platinum substrates and coated with Zr as show in FIG. 30. These Zr-coated CNF were heated to form ZrC on the surface of the CNF a shown in FIG. 31.

The potential of CNS as a catalyst support material is further enhanced by reports indicating that carbon materials, such as porous carbon, amorphous carbon nitride thin films, and nanotubes may be able to stabilize nanoparticles more effectively than flat surfaces and may even promote nanocrystal formation. This characteristic may be due to the increased activity at defect sites which are incorporated into the graphitic carbon lattice. With their large specific surface area and high defect density in an all carbon sp$^2$ matrix, CNF (including CNS) offer an ideal system for fundamental studies of the nature and energy of the defect sites in nanoparticle stabilization. Fundamental information on the physical structure, electron affinity, and chemical reactivity of defects and dopants in carbon-based materials is useful in the catalyst, tribological, and lubrication fields and applications. Thus, CNF may be used in both catalyst and lubrication applications.

As shown in FIG. 5, carbon nanosheets have a high density of atomic scale vertical graphitic edges that are potential sites for electron field emission. Based on its 2D geometry, this sheet-like carbon nanostructure is expected to be a more robust edge emitter than carbon nanotubes.

The CNF may be used in a wide variety of applications. As mentioned previously, CNF may be used for hydrogen storage, as field emitter, and as catalyst supports. In addition, CNF may be used in composite materials, such as with photoresist or polymeric materials. CNF may also be used as blackbody absorbers. The corrugated nature of CNF surfaces may serve as an excellent scatterer of infrared and visible radiation. Aligned CNF may be used to construct microfluidic devices where the CNF form the walls of the microfluidic passages. One of ordinary skill in the art would be readily able to apply CNF to additional applications.

Methods of Making Carbon Nanoflakes

Figure 12:
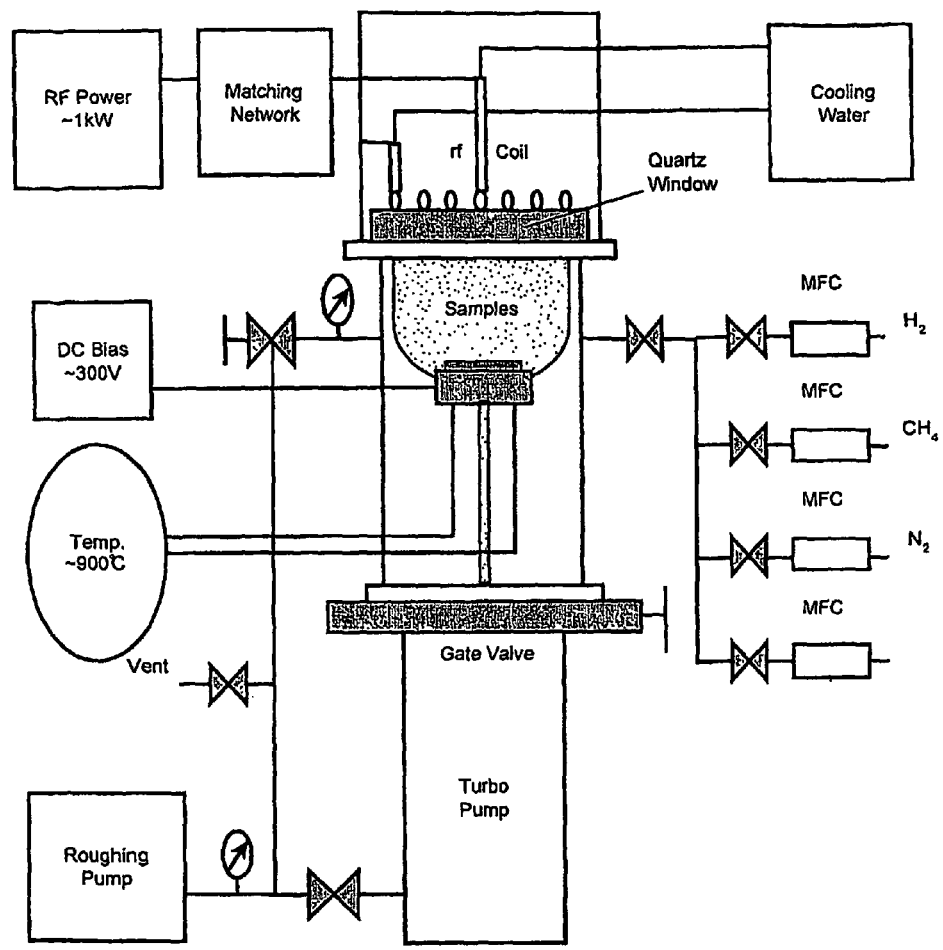
FIG. 12 shows a schematic diagram of the inductively coupled radio frequency plasma enhanced (RF-PECVD) system.

In some embodiments, radio frequency plasma enhanced chemical vapor deposition (RF-PECVD) may be used to form CNF with or without the use of nanoparticle lithography and with or without using a growth catalyst on a substrate. A schematic of a RF-PECVD system is shown in FIG. 12. CNF can be formed on a variety of substrates without using catalyst or any special substrate preparations. Suitable substrates include, but are not limited to, Si, W, Mo, Zr, Ti, Hf, Nb, Ta, Cr, 304 stainless steel, SiO$_2$, and Al$_2$O$_3$. The radio frequency energy may be inductively coupled, as in preferred embodiments, or capacitively coupled.

The RF-PECVD growth of CNF can occur in a wide range of environments. Substrate temperatures may be between 550° C. and 950° C. The effects of varying substrate temperatures on CNS growth can be seen in FIG. 13. In some embodiments, the substrate temperature is between 600° C. and 750° C., such as between 680° C. and 720° C., and in some embodiments, the substrate temperature is between 650° C. and 800° C., such as between 700° C. and 750° C. Chamber pressure can be maintained between 50 mTorr and 200 mTorr. In some embodiments, the chamber pressure is between 50 mTorr and 100 mTorr, such as between 70 mTorr and 90 mTorr, and in some embodiments, the chamber pressure is between 100 mTorr and 200 mTorr, such as 100 mTorr and 120 mTorr. Plasma power may be 700 W or above. In some embodiments, the plasma power is greater than 800 W, and in some embodiments, the plasma power is greater than 900 W. Deposition time may be between 5 and 40 minutes. In some embodiments the deposition time is 20 minutes or less, and in some embodiments, the deposition time is 10 minutes or less. The gas flow rate may be any flow rate that provides adequate gas, i.e., a carbon source, for CNF growth. Any suitable gas flow rate may be used, such as any flow rate that provides enough carbon for CNF growth. For example, for a 1 cm$^2$ substrate, 0.001 sccm (standard cubic centimeters per minute) of CH$_4$ offers a 1 nm a minute growth rate of carbon for a 100% collection efficiency at the substrate. The upper end of the flow rate range is limited by how fast you the pump works to maintain a desired the pressure in the chamber.

Any suitable carbon containing CVD source gas, such as hydrocarbon gas, may be used. In some embodiments, the CVD source gas is methane while in other embodiments, the CVD source gas is acetylene. In some embodiments, the proportion of methane to hydrogen can vary between 0.05%:99.95% and 100%:0%, and in some embodiments, the proportion of acetylene to hydrogen can vary between 0.05%:99.95% and 60%:40%. FIG. 14 shows the effects of differing concentrations of methane and acetylene on CNS growth. Preferably, a high coupling efficiency is selected with low reflected power, for example, less than 50 W.

Surprisingly, the most "crystalline" CNF, as determined by SEM, XRD, and Raman, occur at the lower end of the temperature and CH$_4$:H$_2$ ratios, which is highly unusual since carbon nanostructures tend to form via competing processes and therefore have a prime location in the middle of the parameter window. FIG. 25(B) shows the growth rate of carbon nanosheets as a function of substrate temperature.

Increasing the substrate temperature during nucleation improves deposition and makes monolayer CNS the primary product. In some embodiments, the substrate temperature is increased by between 20° C. and 50° C. during nucleation, such as an increase from 680° C. to 720° C. In some embodiments, the substrate temperature is increased by between 10° C. and 30° C. during nucleation, such as an increase from 650° C. to 670° C.

Figure 29A:
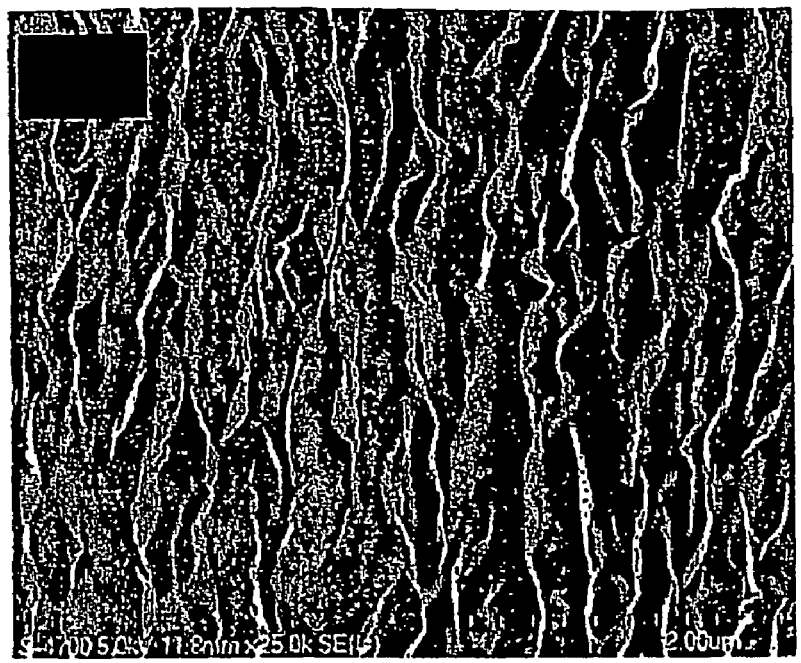
FIG. 29 shows aligned images of aligned carbon nanosheets.
Figure 29B:
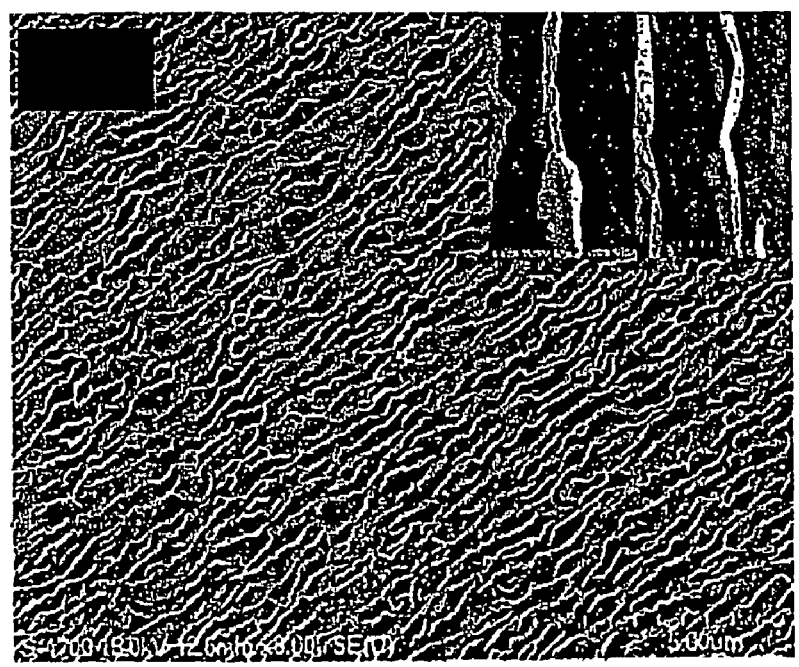

In some embodiments, an electric field may be applied parallel to the substrate. This electric field may be formed by attaching a grounded electrode the substrate. In some embodiments, the electric field is created by placing a vertical grounded wire or strip on the substrate. In some embodiments, multiple electrodes may be attached to the substrate to create a plurality of electric fields. Experiments suggest that attaching a grounded electrode to the substrate leads to the formation of a more aligned CNF product. FIG. 29 shows aligned nanosheets obtained by attaching a grounded electrode to the substrate during nanosheet formation. Creating a plurality of electric fields may allow the alignment to be better controlled and different alignment directions to be selected on different regions of the substrate. Aligned CNF may be useful for nanofluidic devices and exhibit improved field emission performance. In some embodiments, aligned CNF may be obtained without using an electric field.

In one embodiment, carbon nanostructures may be made using a substance covered with a catalyst pattern made by a nanoparticle lithography method. The carbon nanostructures that may be made using the nanoparticle lithography method include, but are not limited to, nanotubes, nanorods, and nanoflakes (including CNS). The nanoparticles used as the lithography mask may be of any suitable size or orientation including, but not limited to, nanospheres. In addition, the nanoparticles may have any suitable composition including, but not limited to, latex, polystyrene, and $SiO_2$. The nanoparticles are applied to a substrate. The substrate may be any suitable substrate, including, but not limited to, Si, glass, quartz, plastic, ceramic, and metal substrates.

Figure 15:
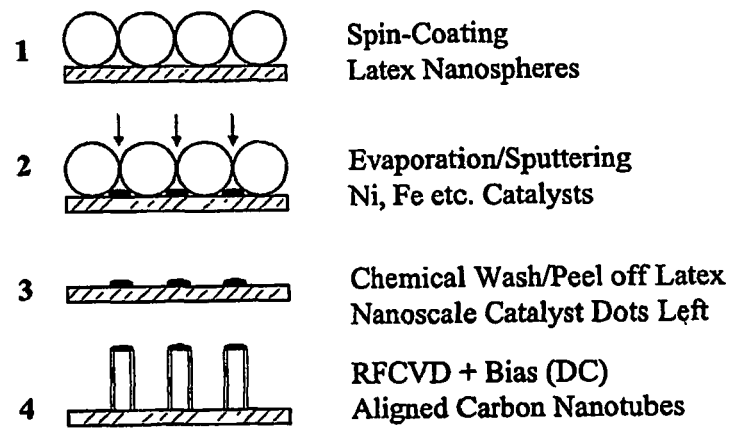
FIG. 15 shows a schematic of one embodiment for making carbon nanostructures using nanosphere lithography.

FIG. 15 illustrates one embodiment for practicing the nanoparticle lithography method for forming CNF. In addition, Wang et al., *Synthesis and field-emission testing of carbon nanoflake edge emitters*, J. Vac. Sci. Tech. 22(3):1269-72 (2004), which is hereby incorporated by reference in its entirety, teaches some conditions and methods for using nanoparticle lithography to form nanostructures.

The method comprises coating a substrate with nanoparticles. In some embodiments, the nanoparticles are latex nanospheres. Latex nanospheres have the advantageous property of self-assembling to form a hexagonally close-packed layer on top of a substrate. However, other nanoparticles may also be used. In addition, a variety of substrates may be selected, such as Si. The nanospheres may be applied to the substrate using a variety of methods, such as spin-coating. The nanospheres may form a pattern, such as the hexagonally close-packed (hcp) pattern of spin-coated latex nanospheres, or any other desired pattern including a random pattern.

Once the nanospheres are applied to the substrate, a catalyst, such as Ni or Fe, may be applied to the nanosphere coated substrate. However, catalyst is not necessary to form nanostructures, and in some embodiments catalyst is not applied. Catalyst may be applied using evaporation, sputtering, or any other suitable method. Due to the nanosphere layer, some of the catalyst will be deposited on the nanospheres while other catalyst will pass through the intersphere holes and be deposited on the substrate. The size of the catalyst particles and nanospheres may be selected based on the desired density and other characteristics of the resulting CNF.

Once catalyst is applied, the nanosphere mask may be removed using a variety of chemical or mechanical methods depending on the mask used. For examples, latex nanospheres may be removed from the substrate by dissolving them in $CH_2Cl_2$ with the aid of sonication. Thus, the catalyst on the nanospheres is lifted off leaving a catalyst pattern on the substrate. In another embodiment, the mask is not removed, and the carbon nanostructures are grown on the substrate with mask that may or may not be coated with a catalyst. The mask is removed after nanostructure growth.

Figure 16:
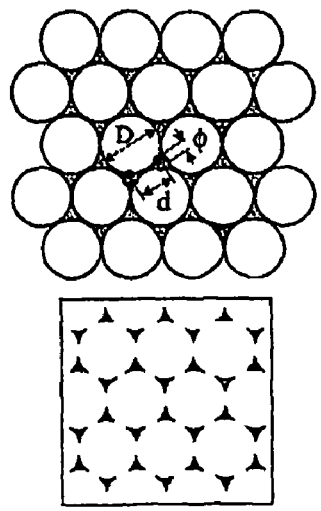
FIG. 16 shows a schematic and calculations of intersphere hole spacing and equivalent diameter based on latex nanospheres with four different diameters.

FIG. 16 shows intersphere hole spacing and equivalent diameter based on latex nanospheres of four different diameters. Intersphere hole spacing and equivalent diameter equals 0.577D and 0.23D, respectively where D is the latex sphere diameter. One of ordinary skill in the art may select the composition and dimensions of the nanoparticles depending on the particle pattern desired.

In summary, one embodiment comprises coating a substrate with nanoparticles; coating the nanoparticle coated substrate with catalyst; removing the nanoparticles to form a catalyst pattern; and growing CNF/CNS on the catalyst pattern. In addition, nanotubes, nanorods, and other nanostructures may also be made using the patterned substrate.

Figure 17:
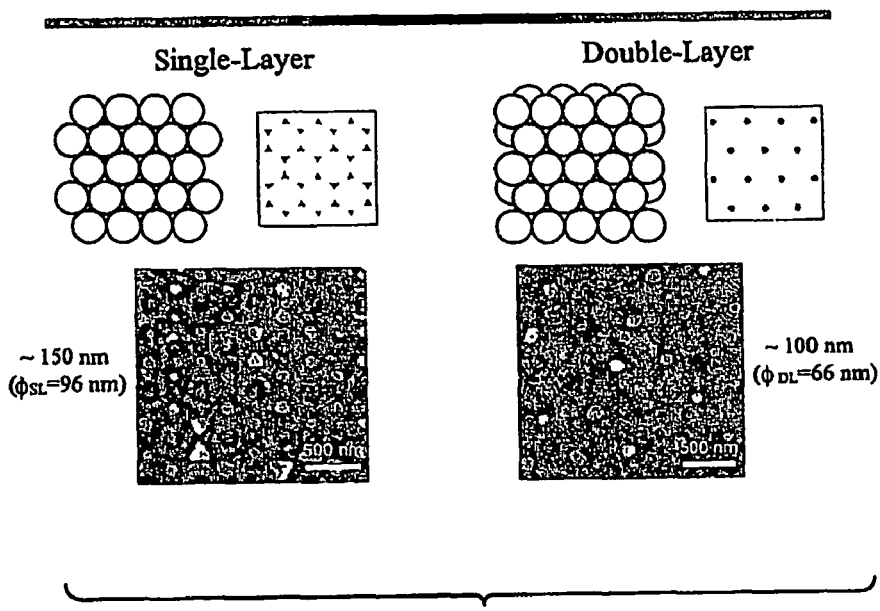
FIG. 17 shows a comparison of double-layer and single-layer nanosphere lithography masks.
Figure 18:
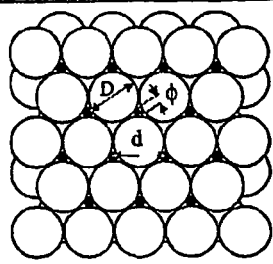
FIG. 18 shows calculations of intersphere hole spacing and equivalent diameter in a double-layer mask based on latex nanospheres with four different diameters.
Figure 18:
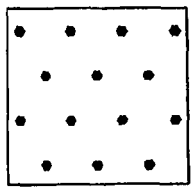

In some embodiments, a multiple layer nanoparticle mask may be used. For example, a double layer latex nanosphere mask may be used. The layers may include the same type of nanoparticles or nanoparticles of differing compositions and/or sizes. For the single-layer nanosphere pattern, there are six triangle-shaped holes around each nanosphere as shown in FIG. 17. The second layer of latex sphere will completely block three of them and make the other three much smaller, and also make the spacing bigger as further illustrated in FIG. 17. The intersphere hole spacing and equivalent diameter is D and 0.16D, respectively, where D is the latex diameter as show in FIG. 18. All the calculated $d_{SL}$ and $\phi_{SL}$ for four sizes of latex nanospheres are listed in the table in FIG. 18. FIG. 17 shows both a schematic comparison of single-layer to double-layer masks in addition to an actual comparison of a single-layer to double-layer latex nanosphere mask using SEM.

Figure 19:
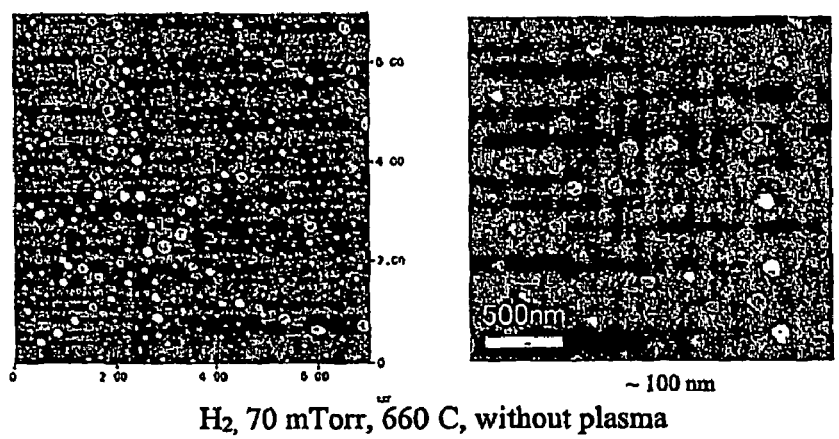
FIG. 19 shows Ni patterns from a single-layer nanosphere mask annealed at 660° C.
Figure 20:
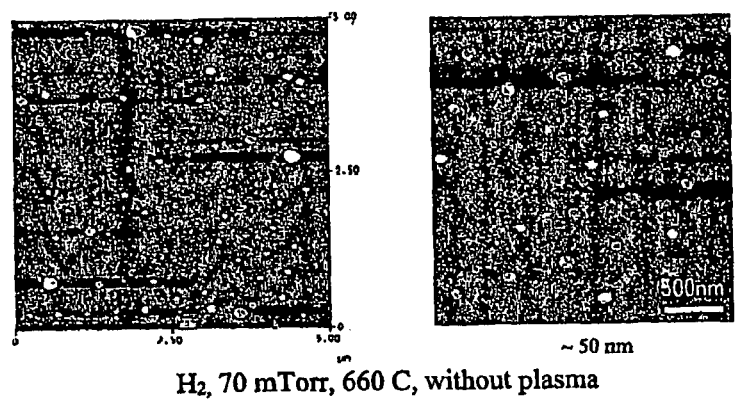
FIG. 20 shows Ni patterns from a double-layer nanosphere mask annealed at 660° C.

When the Ni patterns were annealed at 660° C., the dot spacing remained the same, but the dot size became smaller and higher as shown in FIG. 19. The same effect was observed in the double-layer pattern as shown in FIG. 19.

Finally, the CNF may be grown on the patterned substrate using a variety of techniques, such as the radio frequency plasma enhanced chemical vapor deposition (RF-PECVD). In some embodiments, DC bias is used to improve the nanostructure alignment. Alternatively, the electric field at the substrate may be separated from the carbon source to make CNS or CNF. By placing either a strong DC or alternating field (frequency ranging through RF and into microwave bands) potential on the substrate (commonly referred to as a substrate bias), CNS or CNF may be formed on the substrate with any suitable carbon sources. Possible sources include a DC plasma enhanced chemical vapor deposition source using the same or similar gases as described above. Furthermore, low frequency alternating potentials and drive currents may be used to both produce an electric field at the surface and/or to sustain the energy inputs needed to produce the active species for deposition. For example, 60 Hz systems may be used and may be scaled to arbitrarily large power levels at very low cost. For example, the system and method described in U.S. Pat. No. 5,372,686, incorporated herein by reference in its entirety, may be adapted for CNS and CNF growth. It should be noted that carbon bearing gases other than methane and acetylene may be used, such as other hydrocarbon gases, alone or in combination with terminating gases including $H_2$, $F_2$ and/or $Cl_2$. Other carbon sources include a sputter source (DC or RF), an evaporation source (flash or electron beam), or a laser ablation source which ablates carbon from a target.

EXAMPLES

Example 1

Preparing Substrates Using Nanosphere Lithography

Highly doped single-crystal Si (100) wafers, with a layer of 365 nm $SiO_2$ (Silicon Materials Inc.), were used as a substrate for carbon nanoflake deposition. Commercially available, 419 nm diameter, self-assembled polystyrene nanospheres (8% Interfacial Dynamics Corporation) were used as lithography masks for preparation of periodic Ni catalysts dots. The nanospheres were received from the manufacturer as a suspension in water and then further diluted in a solution of the surfactant Triton X-100/methanol (1:400 by volume) by a factor of 1:5. Self-assembled nanosphere single-layer masks were created by a spin-coater (Chemat Technology KW4A) at 900 rpm. Double-layer masks were obtained with lower reproducibility by increasing the nanosphere concentration in the spin-coating solution. Thin films of Ni, 10-30 nm in thickness, were then deposited on the coated Si substrates by electron-beam evaporation. After Ni deposition, the nanosphere masks were removed from the substrate by dissolving them in $CH_2Cl_2$ with the aid of sonication for 1-5 min.

Figure 21:
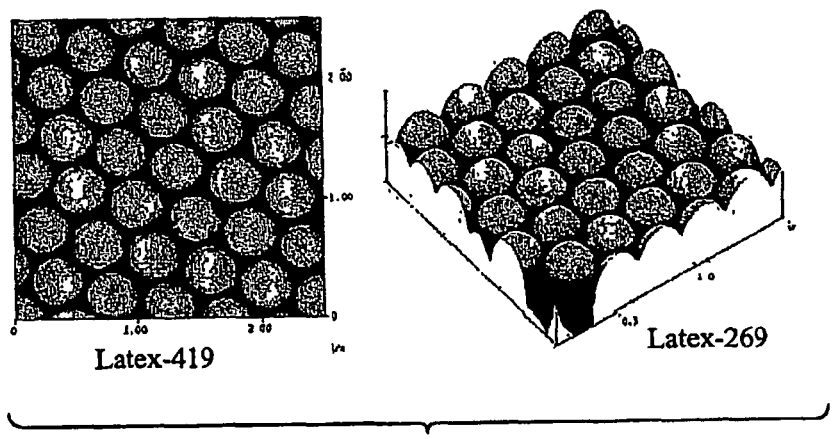
FIG. 21 shows AFM images of latex nanosphere masks.
Figure 22:
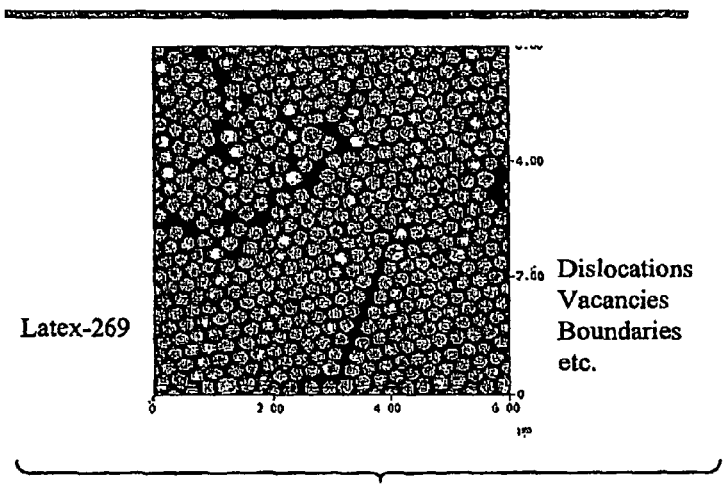
FIG. 22 shows AFM images of latex nanosphere masks with less magnification than FIG. 21 to show defects.
Figure 23:
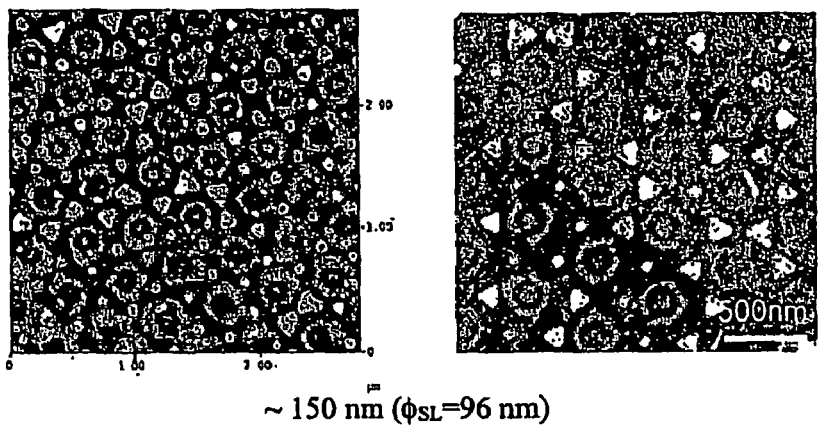
FIG. 23 shows AFM images of Ni catalyst patterned on a Si substrate after removal of the nanosphere latex mask.

An atomic force microscope (AFM) (Veeco Digital Instrument—Nanoscope IV) was used to analyze the masks and deposited Ni catalyst. FIG. 21 shows a top and side AFM view of the nanosphere latex masks used to make the CNF. FIG. 22 shows a nanosphere latex mask at less magnification than FIG. 21 to show some defects. As can be seen from the FIGS. 21 and 22, the nanospheres are generally evenly distributed with some defects, such as dislocation, vacancies, and grain boundaries. FIG. 23 shows AFM patterns after the latex mask was removed from the substrate. FIG. 23 shows triangle-shaped dots of Ni where there were previously latex intersphere hole sites and rings where the latex spheres themselves were located. While the triangle-shaped dots are Ni, the rings may be some organic materials from interaction between latex and Ni.

Example 2

Forming CNF Using a Ni Catalyst on a Si Substrate

Figure 24:
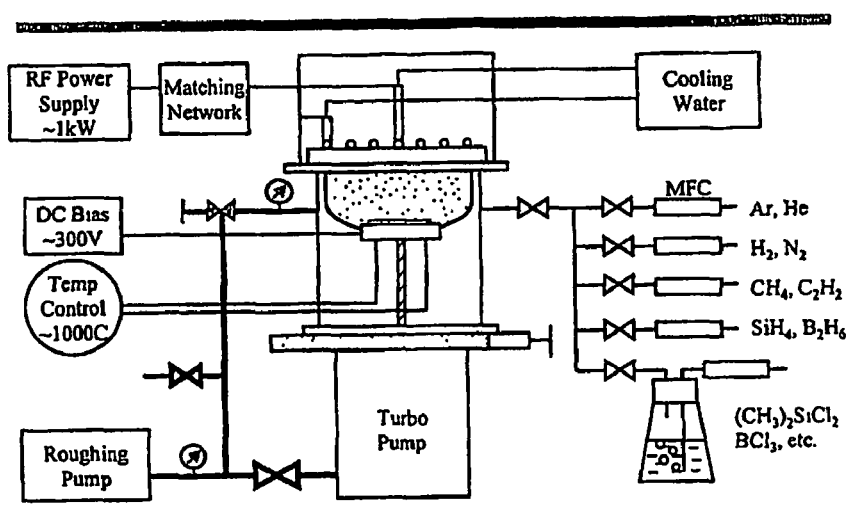
FIG. 24 shows a schematic diagram of a RF-PECVD system.

Carbon nanoflakes were grown on the substrates described in Example 1 in an inductively coupled RF-PECVD system, schematically illustrated in FIG. 24, which is very similar to FIG. 12 described above. The planar coiled RF antenna sits on the quartz window above the deposition chamber. This inductive mode RF plasma has a much higher plasma density (about 10 times) than that of capacitive systems, and also requires a lower pressure (<0.12 Torr preferred). The vacuum background of this system was about $10^{-7}$ Torr provided by a 450 L/s turbo pump. During deposition, the RF power, substrate temperature, and deposition pressure were maintained at 900 W, 680° C., and 70-90 mTorr, respectively. Methane was used as the carbon source in an $H_2$ atmosphere with the concentration of methane varying from 10% to 40%, overall gas flow rates at 10 sccm, and depositions of 5-10 min for desired sample thicknesses.

FIG. 2 shows SEM images of the resulting CNF. FIG. 1 shows the Raman spectra (Raman spectrometer—Ramanor U-1000) from carbon nanoflakes grown at different $CH_4$ concentrations. Two main features in the Raman spectra are the D (1350 cm-1) and G (1580 $cm^{-1}$) peaks, and are usually assigned to nanocrystalline graphite associated with structural defects and perfect crystalline graphite, respectively. The shoulder of the G peak at 1620 $cm^{-1}$ is also suggested to be peak splitting from crystalline graphite. The higher $CH_4$ concentration grown carbon nanoflakes have stronger D peaks, while the sharp G peak and weak D peak are characteristic of the 10% $CH_4$ growth. The strong D peak usually indicates an even more nanocrystalline structure and the presence of a large amount of defects. The most likely candidates for the defects are the amorphous carbon and/or some highly distorted structures.

The work function given by Kelvin probe (McAllister KP6500) measurement is about 4.3 eV, which is near that of graphitic carbon (4.39 eV). The carbon nanoflakes have a high density of sharp graphitic edges, which are potential sites for field emission. FIG. 6 shows the current density (J) vs electric field (E) characteristics of a nanoflake film grown on Si substrate. The inset is the corresponding Fowler-Nordheim plot. This data shows a current density of 0.6 $mA/cm^2$ at 18 V/μm, which is comparable to some carbon nanotubes and other nanostructures. It is noted that a lower turn-on field, such as 4.7 V/μm, may be obtained for CNS, as shown in FIG. 7, for example.

Example 3

Determining the Specific Surface Area of CNS

In order to quantify the high surface-to-volume ratio and corresponding large specific area that the atomic-scale thickness of carbon nanosheets provides, Brunauer-Emmett-Teller (BET) measurements were obtained from Clear Science Inc. (www.clearsci.com). The samples were purged with ultra high purity (UHP) nitrogen overnight at 300° C. before measurement. BET data was collected with UHP nitrogen over a pressure range from 0.05 to 0.30 relative pressure. A Micromeritics Gemini 2375 was used for the specific surface area analysis. The substrates were weighed to a standard deviation of ±0.02 mg before and after deposition using an Ohaus AP250D electronic balance. BET measurements of carbon nanosheet samples yielded a specific surface area of 1300±300 $m^2/g$ (the large standard deviation of the electronic balance used lead to the large error in the specific surface area). This is almost the same as the theoretical value for an ideal double layered graphene structures, 1315 $m^2/g$, is within the uncertainty limits of the calculated value of single-walled carbon nanotubes, and is equal to or higher than the typical specific surface area of activated charcoal (1000 $m^2/g$). Considering that carbon nanosheet structure can be readily grown on various types of substrates (see below), such as Si, $Al_2O_3$, Ni, Ti, Cu, Ag, Au and stainless steel, it has great potential for sensor, catalyst support and other high specific surface area applications.

Example 4

Forming CNS Using RF-PECVD

Carbon nanosheets were grown in an RF-PECVD system schematically illustrated in FIG. 12. RF (13.56 MHz) energy was inductively coupled into the deposition chamber with a planar-coiled RF antenna (~20 cm in diameter) through a quartz window. The plasma density of this inductive plasma is ~10 times greater than that that in a capacitive mode at the same RF power input. Before deposition, neither catalyst nor special substrate treatment was needed. Substrates were simply cleaned by sonicating in ethanol for several minutes and then dried in air. The resistively heated sample stage was positioned 4-8 cm below the quartz window. The substrate temperature was measured by a thermocouple on the upper surface. Mass flow controllers (MFC, MKS 1259B) were used to control the gas flow. During deposition, the RF power, total gas flow rate and gas pressure were kept at 900 W, 10 sccm (standard cubic centimeters per minute) and about 12 Pa for all experiments, respectively. Methane was used as the carbon source with a volume concentration range of 5-100% in an $H_2$ atmosphere. Substrate temperature was varied from 600° C. to 900° C. Depositions were run for durations of 540 min. Substrates used in this study include Si, $SiO_2$, $Al_2O_3$, Mo, Zr, Ti, Hf, Nb, W, Ta, Cu and 304 stainless steel.

Example 5

CNS Formed Using RF-PECVD

The CNS made according to the method described in Example 4 were analyzed. FIG. 14 shows SEM images of carbon nanosheets grown at different $CH_4$ concentrations on Si substrates. From 10% to 100% $CH_4$, all samples show the same highly corrugated sheet-like feature with almost the same thickness, standing on edges on the substrate. The sheet size decreases with the increase of $CH_4$ concentration probably because of the higher nucleation tendency. The overall translucent appearance of these nanosheets under the low energy electron beam (5 kV) suggests a thin, uniform thickness along the entire plane, similar to that observed for nanotubes.

Figure 13A:
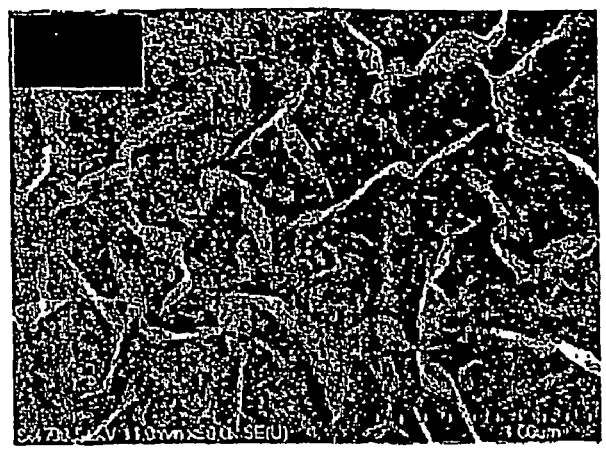
FIG. 13 shows SEM images of carbon nanosheets grown at different substrate temperatures on SI substrates: (A) 630° C.; (13) 730° C.; (C) 830° C. Other depositions conditions are RF 900 W, 40% methane, 12 Pa, 20 min.
Figure 13B:
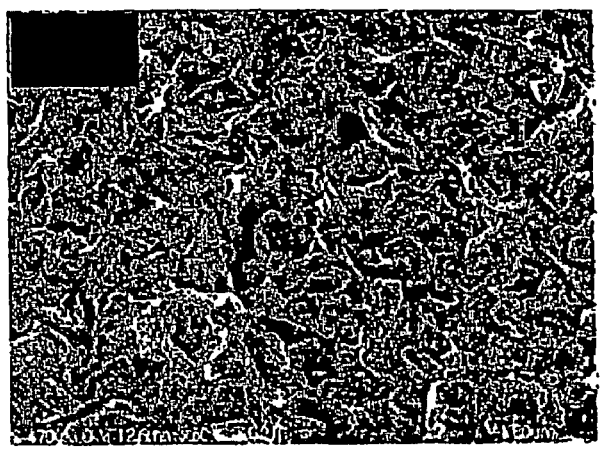
Figure 13C:
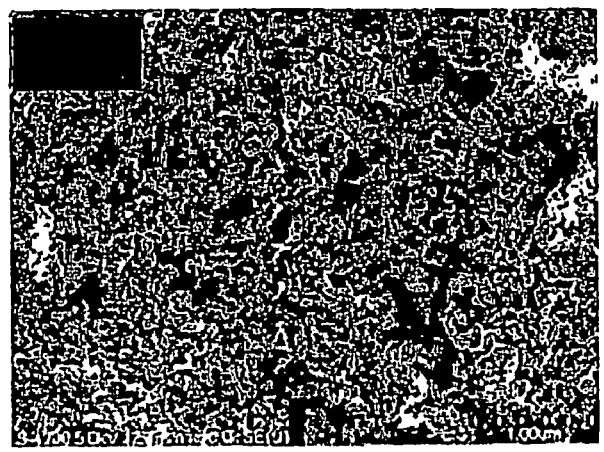
Figure 14A:
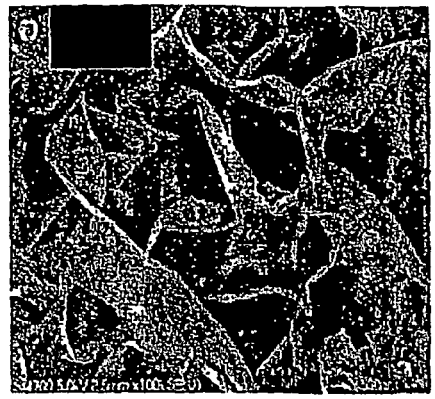
FIG. 14 shows SEM images of carbon nanosheets grown at different methane and acetylene concentrations on Si substrates: (A) 10% $CH_4$; (B) 40% $CH_4$; (C) 100 $CH_4$; (D) 10% $C_2H_2$; and (E) 40% $C_2H_2$. Other deposition conditions for FIGS. 14(A)-(C) were RF 900 W, 680° C., about 12 Pa, 20 min.
Figure 14B:
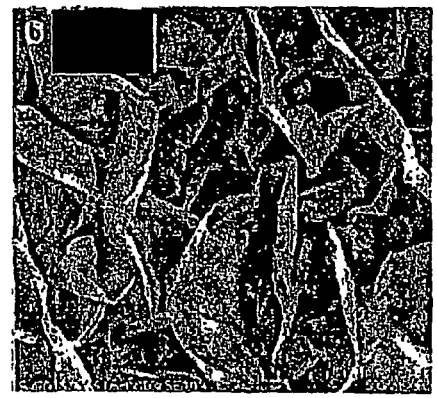
Figure 14C:
Figure 14D:
Figure 14E:
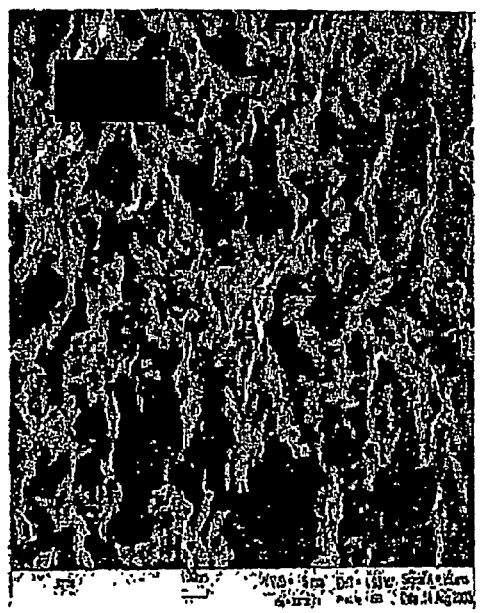

FIG. 13 shows SEM images (Hitachi S-4700) of the carbon nanosheets grown at different substrate temperatures between 630° C. and 830° C. The substrate temperature has a much stronger effect on the carbon nanosheet growth compared to the $CH_4$ concentration. At 630° C., the sheet density is much lower, indicating that both nucleation and growth rates are slow. At 730° C., the morphology is similar to that at 680° C. as shown in FIG. 14(B), but the sheet surface is much smaller and less smooth. The nanosheets interlace together and form a nest-like structure. At 830° C., the sheet planes become more corrugated and agglomerated but still keep the sheet-like feature and do not markedly increase in thickness.

Figure 25A:
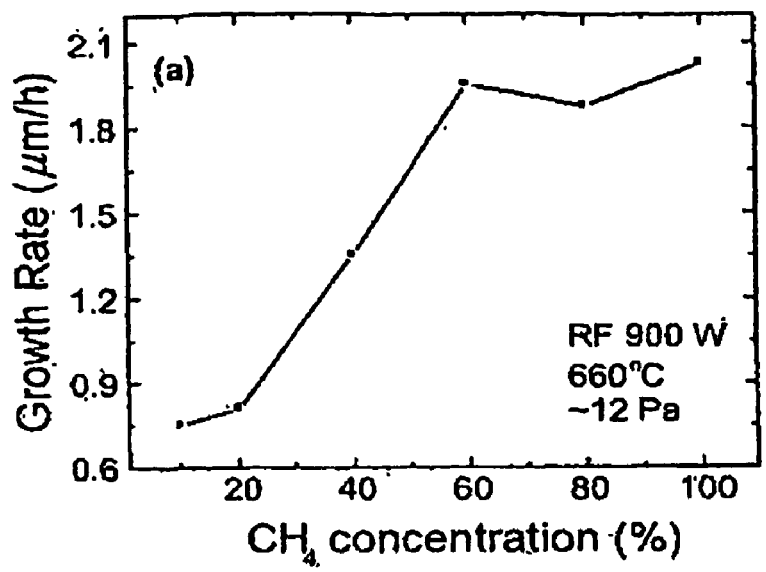
FIG. 25 shows (A) the growth rate of carbon nanosheets as a function of $CH_4$ concentration and (B) the growth rate of carbon nanosheets as a function of substrate temperature.
Figure 25B:
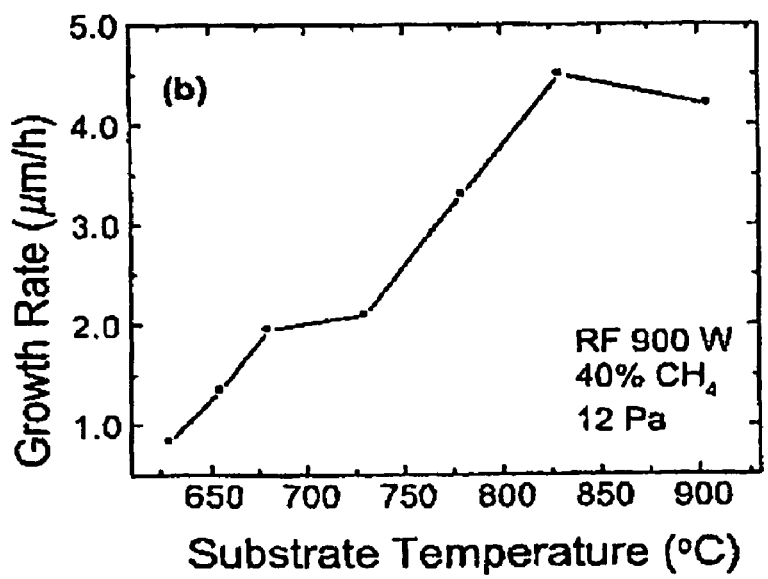

FIG. 25 shows that the growth rate of sheet plane obviously increases with $CH_4$ concentration and/or substrate temperature, though their thicknesses do not change as shown in FIGS. 13 and 14.

Figure 28A:
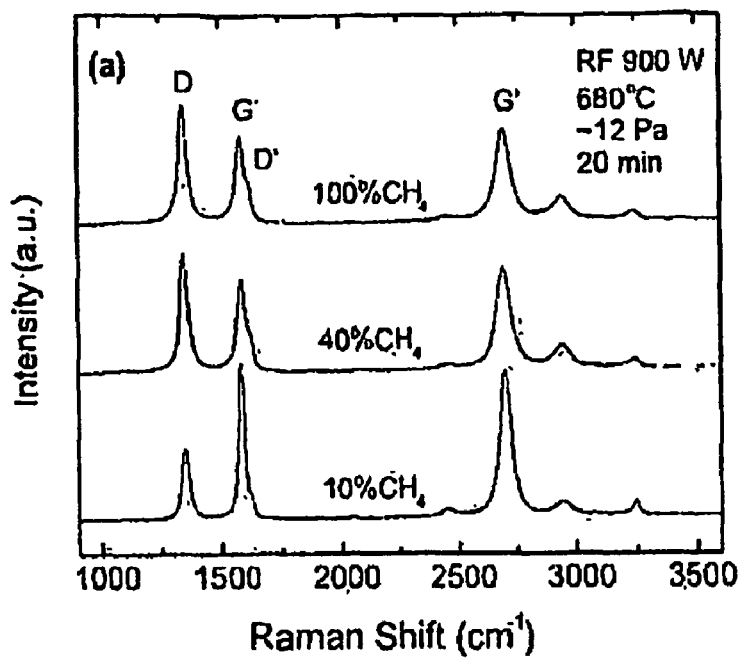
FIG. 28 shows (A) Raman spectra of carbon nanosheets grown at different $CH_4$ concentrations and (B) Raman spectra of carbon nanosheets grown at different substrate temperatures.
Figure 28B:
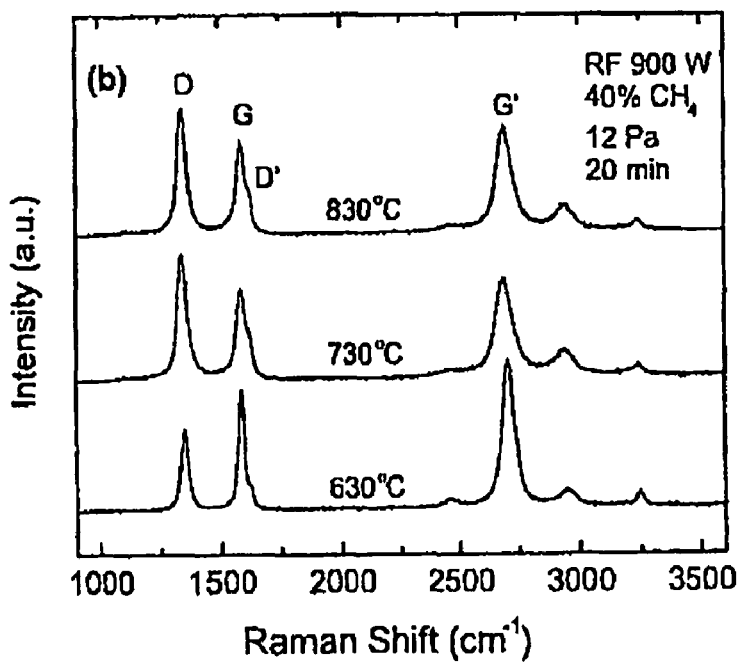

Raman spectra taken on carbon nanosheets, as shown in FIG. 28, are similar to those observed for carbon nanotubes. FIG. 28(A) shows Raman spectra of carbon nanosheets grown at different $CH_4$ concentrations (same samples as in FIG. 14). All samples show the D band (1350 $cm^{-1}$), the G band (1580 $cm^{-1}$) and so-called D' band (a shoulder at about 1620 $cm^{-1}$), which are previously seen in microcrystalline graphite, indicating that carbon nanosheet has a crystalline, but defective graphite structure. It can also be seen that the intensity ratio of the D and G peaks, I(D))1I(G), increases with $CH_4$ concentration, which usually indicates a more nanocrystalline structure and the presence of a large number of defects. The defects may include vacancies and strained hexagonal/non-hexagonal (pentagon or heptagon) distortions that lead to the non-uniformity, corrugation and twisting shown in the electron microscope images. Second-order modes in the range of 2000-3500 $cm^{-1}$ are also present in FIG. 28. The strong peak at 2700 $cm^{-1}$, so-called G' band, is the overtone of the D band. The medium peak at about 2950 $cm^{-1}$ is attributed to the combination of the D and G bands, and the small peak at 3250 $cm^{-1}$ is the overtone of D' band. FIG. 28(B) shows the Raman spectra taken from nanosheets grown at different substrate temperatures (same samples as in FIG. 13), which displays the same features as in FIG. 28(A). According to the discussion above, the lower temperature sample shows a better "crystallinity", however, spectra from the other two samples grown at 730° C. and 830° C., are almost the same though their morphologies are quite different.

Since $CH_4$ and $H_2$ were used in the growth process for carbon nanosheets, it is expected that hydrogen will incorporate into nanosheets. Typical carbon nanosheet samples (same samples as in FIG. 14(B)) were analyzed with FTIR and TDS on their hydrogen component. FTIR transmission spectra show obvious absorptions at about 2900 $cm^{-1}$ due to C—H stretching vibrations. TDS data also reveals a very large release of $H_2$ from carbon nanosheets when they were heated up to 800° C. This indicates that the CNS may be useful for hydrogen storage applications.

Example 6

Growing CNS on Different Substrates

Figure 26A:
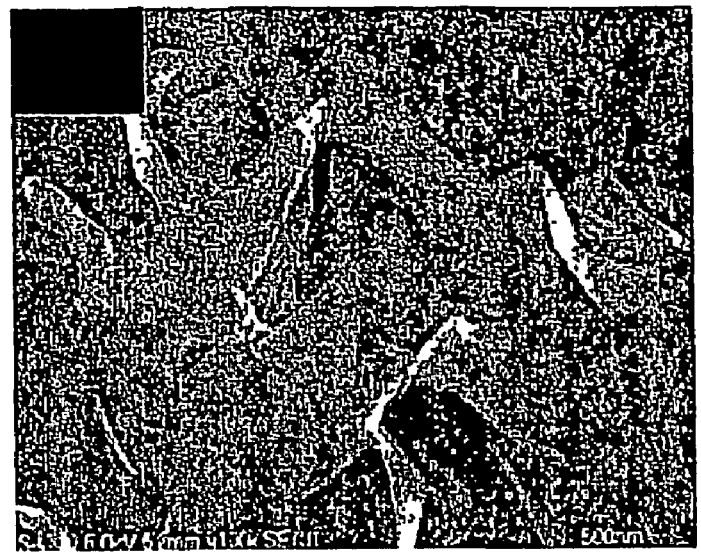
FIG. 26(A) shows nanosheets grown on 304 stainless steel.
Figure 26B:
FIG. 26(B) shows nanosheets grown on alumina. Deposition conditions were RF 900 W, 40% $CH_4$, 680° C., 12 Pa, 20 min.

Carbon nanosheets can be readily grown on a variety of substrates as shown in FIG. 26. FIG. 26 shows two representative nanosheets that were grown on 304 stainless steel and alumina in the same deposition experiment. It can be seen that nanosheet does not change its basic morphology with variation of substrate material. Carbon nanosheets are reproducibly grown on Si, $SiO_2$, $Al_2O_3$, Mo, Zr, Ti, Hf, Nb, W, Ta, Cu and 304 stainless steel substrates and they all show the same general morphology. This non-selective growth property, as well as its flexible growth conditions, gives carbon nanosheet great potential for technological applications.

Example 7

HRTEM and SEM Analysis of CNS

Figure 27A:
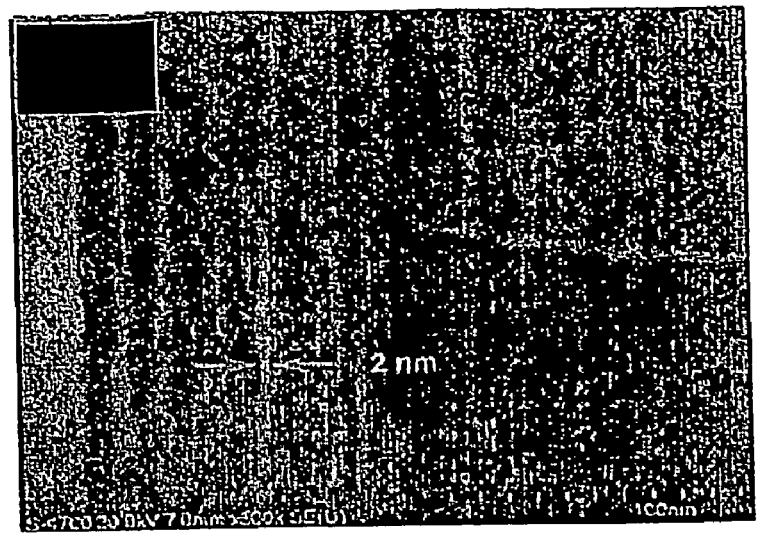
FIG. 27(A) is a higher magnification SEM image.
Figure 27B:
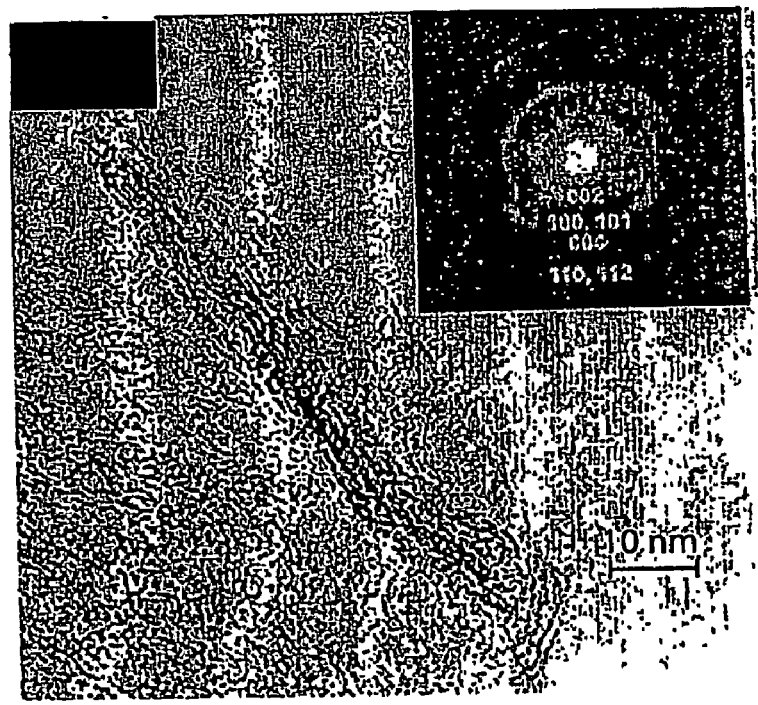
FIG. 27(B) is an HRTEM image with an inset of the electron diffraction pattern indexed on graphite spacing.

FIG. 27 shows a high magnification SEM image (operating at 30 kV) and HRTEM analysis (operating at 200 kV) of individual nanosheets grown under the same conditions as FIG. 14(B). In FIG. 27(A), the upper-right nanosheet is rolled up and shows the cross-section of the edge, which is about 1 nm thick. The image could not be more clearly focused because of the resolution limit of the SEM. The lower-left nanosheet is corrugated with a ridge in the middle. The ridge width, which is at least two layers thick (there has to be a spacing in between as the sheet folds into a corrugation), is measured to be about 2 nm at the narrowest position, indicating that the thickness of a single-sheet is 1 nm or less. With the higher electron accelerating voltage, the SEM also reveals much more internal structure than shown in the typical surface image. FIG. 27(B) is a HRTEM image that displays a similar corrugated nanosheet with a dark folded ridge in the middle of the piece and two dark fringes (arrow points out) at the edge. The number of dark fringes at the edge suggests an even thinner sheet, which may consist of only two graphene layers in stacking. The electron diffraction pattern from nanosheets (FIG. 27(B) inset) is indexed to graphite. The intensive 002 spots indicate a well-stacked structure. The characteristic of this ultra-thin sheet provides an ideal two-dimensional model of graphite structure for fundamental studies. It is also noted that FIG. 4 shows an example of a single layer thick CNS.

Example 8

Method to Fabricate Zirconium Carbide

Zirconium carbide (ZrC) was synthesized on CNF formed substrate. CNF were grown on platinum (Pt) substrates by methods typical of those described herein. Pt substrates were made of thin foils with 0.005" thickness.

Figure 30:
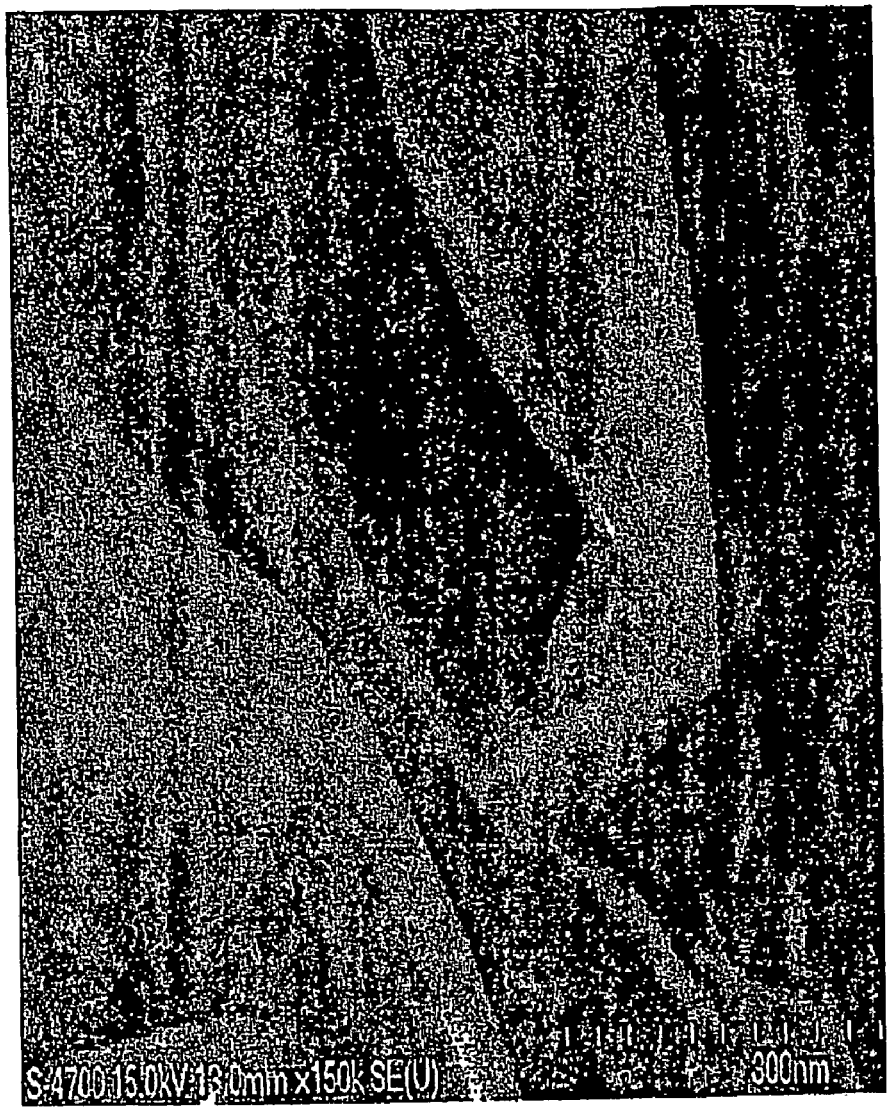
FIG. 30 shows a generic SEM representation of CNF after Zr coating (1 nm) but before ZrC formation.

Then, CNF were coated with Zirconium (Zr) with 1 nm thickness. LEBOW COMPANY (http://www.lebowcompany.com) performed the coating using an e-beam evaporating system. FIG. 30 shows an SEM representation of CNF after Zr coating (1 nm) but before ZrC formation. The CNF show no obvious structural differences after Zr coating. The Zr coated CNF on Pt substrates were heated in an ultra-high vacuum (UHV). The base pressure of the UHV system was 5E-10 Torr. DC current was applied to heat the substrates.

Example 9

Zirconium Carbide Made Using CNF

The heating converted the Zr to ZrC by reacting the Zr with the carbon in the CNF. Auger electron spectroscopy (AES) was used to monitor the chemical bonding transition of the materials on different temperatures. The literature reports that different chemical bonding of carbon have different "fingerprints" on the Auger electron spectrum. A featured carbon AES "fingerprint" was used as the criteria to justify the reaction product of ZrC. SEM was used to observe morphology changes before and after ZrC formation.

Figure 31A:
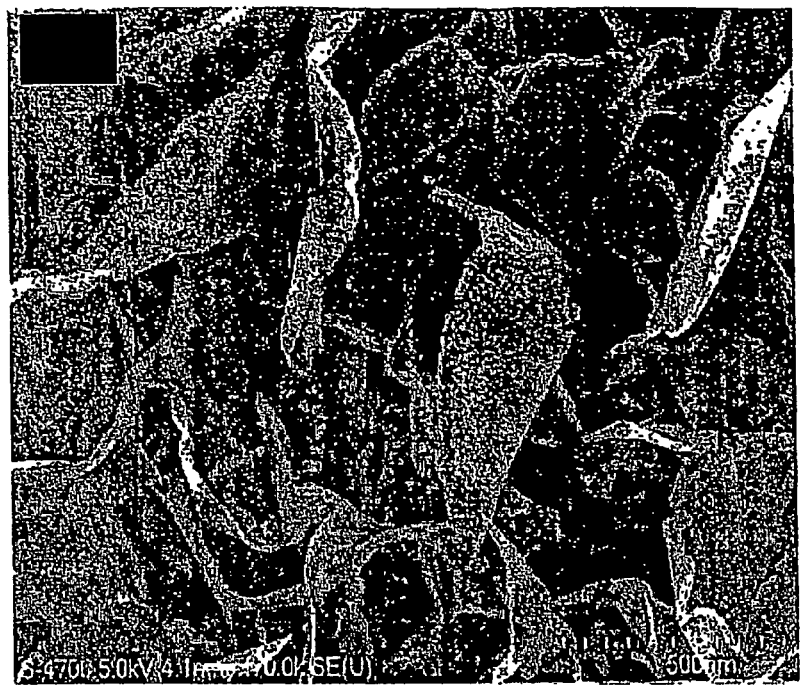
FIG. 31(A) shows one image of CNF after ZrC formation.
Figure 31B:
FIG. 31(B) shows the same image as FIG. 31(A) but magnified.
Figure 32:
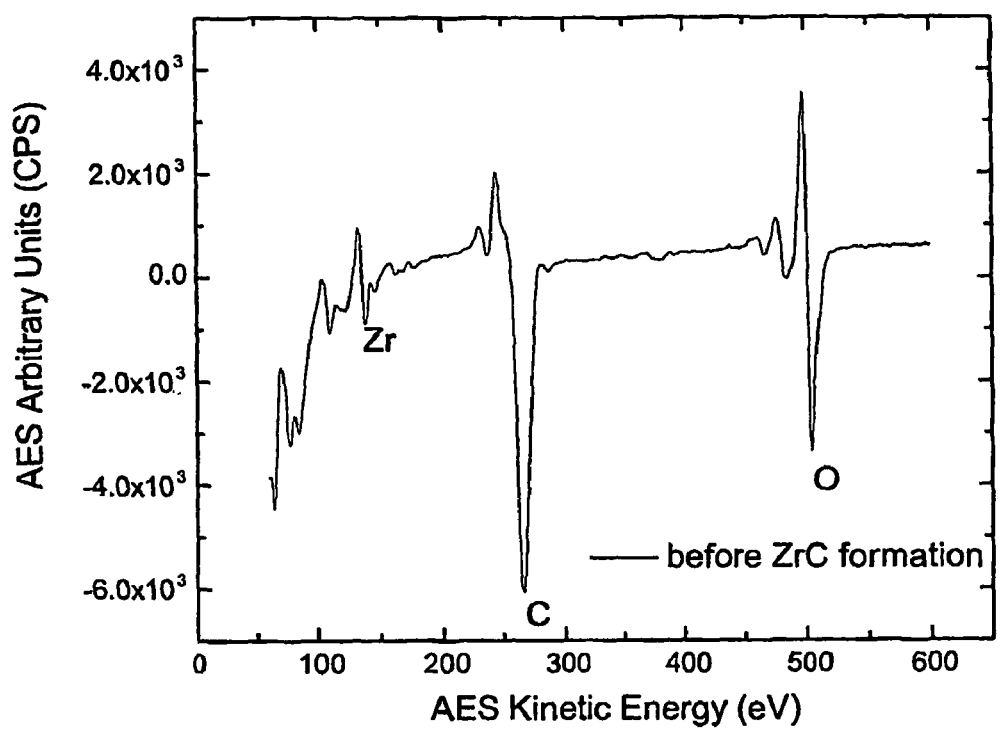
FIG. 32 shows an AES of Zr coated CNFs. CNFs before heating. No ZrC formed yet.
Figure 33:
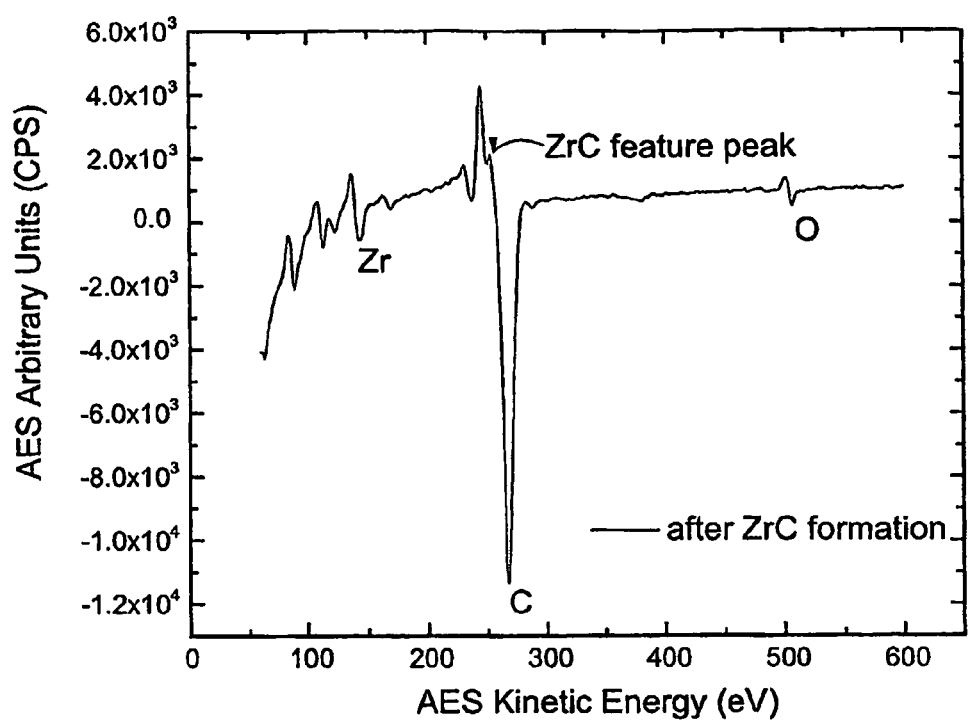
FIG. 33 shows an AES of Zr coated CNFs after heating. Heating lasted 10 minutes at about 1400° C. ZrC formed after heating.

FIG. 31 shows SEM images of CNF after ZrC formation. The ZrC product can be observed as small dots on the CNF. FIGS. 32 and 33 show AES results from before and after ZrC formation. The differences between the two figures suggest that the element Zr experienced a chemical bonding transition from oxide to carbide. After heating, the occurrence of the featured ZrC peak, with a drastic decrease of the oxygen peak supports the conclusion of ZrC formation. Thus, the results indicate that CNF can be used to form ZrC. While an exemplary ZrC coating on CNF or CNS was illustrated, metals other than Zr may be used instead. Any metal (including metal alloys) which can form a metal carbide by reacting with carbon may be used to form the metal carbide coating on the CNF or CNS by reacting with the CNF or CNS. It is noted that a continuous film coating or a nanoparticle coating may be formed on the CNS or CNF and then carburized to form a carbide coating.

Example 10

Doped CNS

Figure 34A:
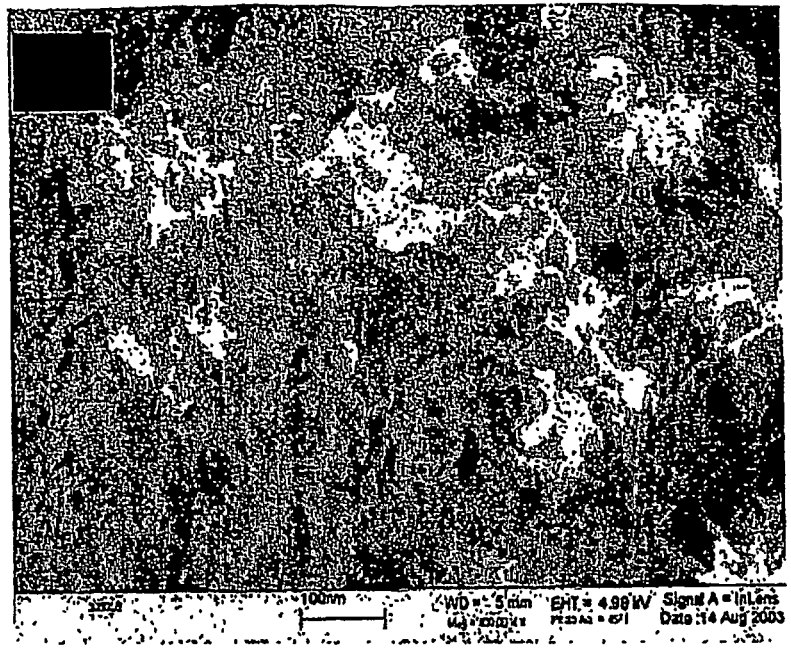
FIGS. 34(A) and (B) show images of doped CNS.
Figure 34B:
Figure 35:
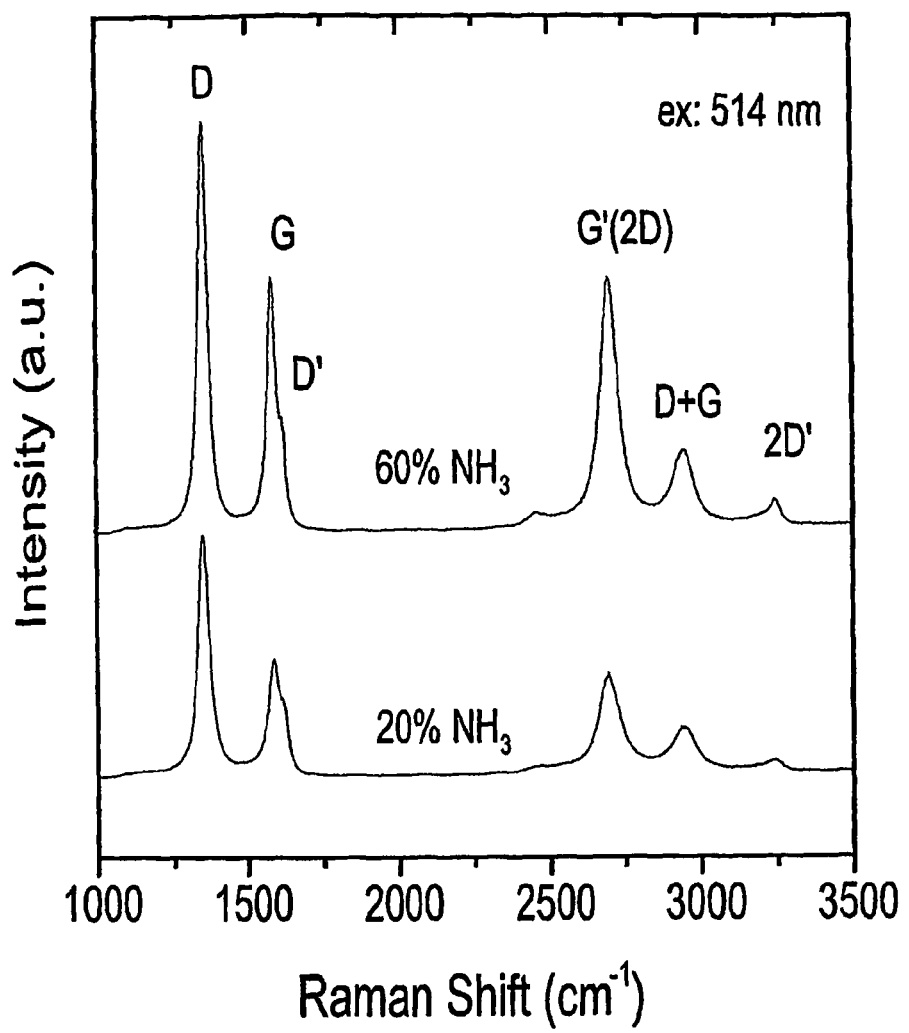
FIG. 35 shows Raman spectrum of nitrogen doped CNS.

FIGS. 34(A) and (B) illustrate doped CNS structures. CNS can be doped with any suitable dopant. In this example, nitrogen was used as the dopant. The source gas in FIG. 34(A) was methane 40% and nitrogen 5%. The source gas in FIG. 34(B) was acetylene 20% and ammonia 80%. FIG. 35 shows the Raman spectrum of nitrogen doped CNS. The CNS keep the basic graphite structure, but the material is more defective than typical CNS samples.

Example 11

Patterned CNS

Figure 36A:
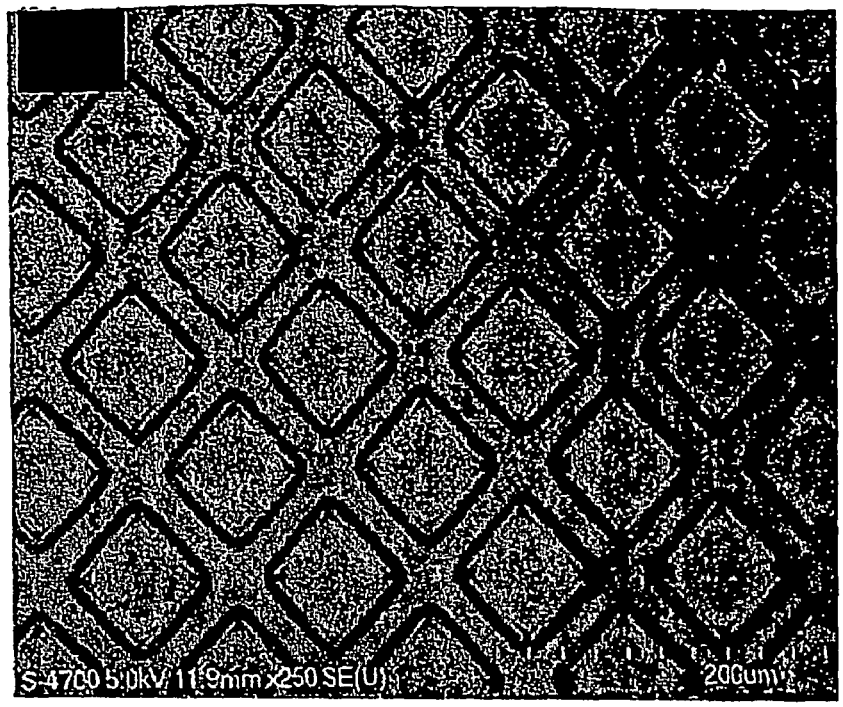
FIGS. 36(A) and (B) show images of patterned CNS.
Figure 36B:
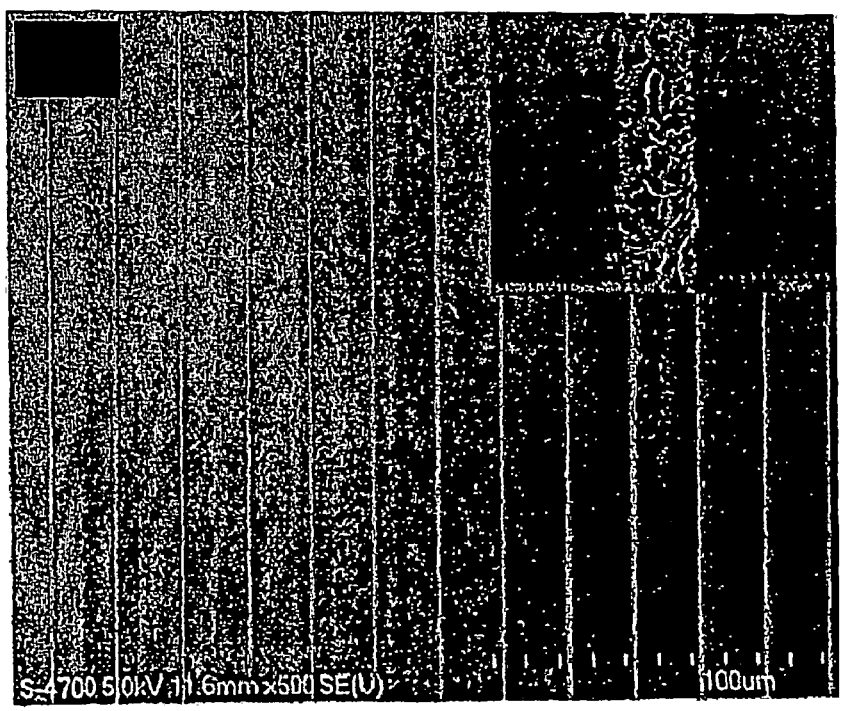

CNS can be easily patterned as demonstrated in FIGS. 36(A) and (B). In FIG. 36(A) the CNS film was patterned using a Cu TEM grid as a shadow mask. In FIG. 36(B), the CNS film was patterned using standard photolithography techniques.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents. All articles mentioned herein are incorporated by reference in their entirety.

What is claimed is:

1. A plurality of carbon nanosheets on a substrate, each of the plurality of carbon nanosheets having a thickness of one nanometer or less, wherein the plurality of carbon nanosheets are aligned and stand on their edges roughly vertically to the substrate.

2. The plurality of carbon nanosheets of claim 1, wherein each of the plurality of carbon nanosheets comprises one to three graphene layers.

3. The plurality of carbon nanosheets of claim 2, wherein each of the plurality of carbon nanosheets comprises a single graphene layer.

4. The plurality of carbon nanosheets of claim 1, wherein:
the specific surface area of the each of the plurality of carbon nanosheets is between 1000 $m^2/g$ to 2600 $m^2/g$;
each of the plurality of carbon nanosheets has a height between 100 nm and 8 μm; and
the plurality of carbon nanosheets are in substantially pure form.

5. An article comprising the plurality of carbon nanosheets of claim 1, wherein the article is selected from a group consisting of a field emitter, a catalyst support, a hydrogen storage device, a sensor, a blackbody absorber, a composite material, and a coating.

6. The plurality of carbon nanosheets of claim 1, wherein the carbon nanosheets comprise crystalline carbon nanosheets.

7. A composition comprising a plurality of carbon nanoflakes having a specific surface area between 1000 $m^2/g$ and 2600 $m^2/g$, wherein the carbon nanoflakes are aligned, freestanding and stand on their edges roughly vertically to a substrate, and wherein each of the plurality of carbon nanosheets has a thickness of one nanometer or less.

8. The composition of claim 7, wherein each of the plurality of carbon nanoflakes has a height of at least 100 nm.

9. The composition of claim 8, wherein:
each of the plurality of carbon nanoflakes has a thickness of one nanometer or less; and
the specific surface area of the each of the plurality of carbon nanoflakes is between 2000 $m^2/g$ and 2600 $m^2/g$.

10. An article comprising the plurality of carbon nanosheets of claim 7, wherein the article is selected from a group consisting of a field emitter, a catalyst support, a hydrogen storage device, a sensor, a blackbody absorber, a composite material, and a coating.

11. The plurality of carbon nanosheets of claim 7, wherein the carbon nanosheets comprise crystalline carbon nanosheets.

* * * * *